(12) United States Patent
Richardson

(10) Patent No.: US 11,529,568 B2
(45) Date of Patent: Dec. 20, 2022

(54) LAYERED STRUCTURES WITH SPACERS AND CHANNELS FOR SEPARATION

(71) Applicant: Imagine TF, LLC, Campbell, CA (US)

(72) Inventor: Brian Edward Richardson, Los Gatos, CA (US)

(73) Assignee: Imagine TF, LLC, Campbell, CA (US)

( * ) Notice: Subject to any disclaimer, the term of this patent is extended or adjusted under 35 U.S.C. 154(b) by 305 days.

(21) Appl. No.: 16/823,368

(22) Filed: Mar. 19, 2020

(65) Prior Publication Data

US 2020/0298143 A1 Sep. 24, 2020

Related U.S. Application Data

(60) Provisional application No. 62/919,639, filed on Mar. 19, 2019.

(51) Int. Cl.
| | | |
|---|---|---|
| *B01D 15/20* | (2006.01) | |
| *B01J 20/02* | (2006.01) | |
| *B01J 20/281* | (2006.01) | |
| *B01J 20/282* | (2006.01) | |
| *C02F 1/28* | (2006.01) | |
| *B01J 20/06* | (2006.01) | |

(52) U.S. Cl.
CPC ........ *B01D 15/206* (2013.01); *B01J 20/0251* (2013.01); *B01J 20/06* (2013.01); *B01J 20/282* (2013.01); *C02F 1/281* (2013.01); *G01N 30/482* (2013.01)

(58) Field of Classification Search
CPC .......... B01D 2313/10; B01D 2313/105; B01D 2313/12; B01D 2313/125; B01D 2201/302
See application file for complete search history.

(56) References Cited

U.S. PATENT DOCUMENTS

| 10,124,275 B2* | 11/2018 | Richardson ........ G01N 30/6095 |
| 2004/0262636 A1* | 12/2004 | Yang ...................... B82Y 30/00 257/E21.108 |
| 2005/0065060 A1* | 3/2005 | Kin .......................... C07B 49/00 510/506 |

* cited by examiner

*Primary Examiner* — Ryan B Huang
(74) *Attorney, Agent, or Firm* — The Kline Law Firm; Keith Kline

(57) ABSTRACT

Devices for the separation of components within a fluid are disclosed herein. The device typically includes layers of spacers and separation surfaces. The separation panels have channels with functionalized surfaces to attract and retain components within the fluid. The separation panels include a border (housing) to constrain the fluid.

20 Claims, 28 Drawing Sheets

LAYERED STRUCTURES WITH SPACERS AND CHANNELS FOR SEPARATION

CROSS REFERENCE TO RELATED APPLICATIONS

This application claims priority of U.S. Provisional Application Ser. No. 62/919,639, filed Mar. 19, 2019. The disclosure of that application is hereby incorporated herein by reference in its entirety.

FIELD OF THE DISCLOSURE

The present disclosure relates generally to architectures for fluidic separation, and more particularly is a layered structure with spacers forming channels for separation of one or more components from a fluid.

SUMMARY

In various embodiments of the present disclosure, separation devices include a housing and at least one separation layer enclosed therein. Both the separation layer and the housing have an inlet port and an outlet port. The separation layer further includes a base or substrate, and ribs or walls to create channels in the separation layer. The channels can be formed in a large plurality of configurations.

The separation layer channels are formed as fully enclosed channels by mating the top and bottom surfaces of the ribs or walls to adjacent surfaces. The fluid requiring separation flows into the channels from the inlet port, passes through the channels, and the separated fluids flow out through the outlet port. It should be noted that the fluid could be either gas or liquid and, in some cases, a fluid containing solid particles that can be made to flow in a fluidic path.

The surfaces of the separation layers are made from either a base material or a base material with a coating that interacts with the fluid. The surface interaction generally attracts and retains a component of the fluid on the base material. By attracting the component or components to the surfaces of the separation layers, the fluid components are either removed or significantly reduced in quantity from the fluid. This type of component removal is commonly used in water filtration to remove unwanted chemicals. The separation process is also used in chromatography. Drug processing chromatography utilizes surface attraction to separate a specific component from a "soup" of many fluidic components. In many cases the separated component is the component of interest. The component is retrieved in a second process where a wash fluid is run though the system that eliminates the attraction of the component to the surface, thereby releasing the component into the wash fluid.

Analytical chromatography adds the further constraint of timing to a separation system. Analytical chromatography is used to separate a large number of components within a solution from one another. This process requires that the flow paths within the system maintain similar lengths and resistance.

BRIEF DESCRIPTION OF THE DRAWINGS

The accompanying drawings, wherein like reference numerals refer to identical or functionally similar elements throughout the separate views, together with the detailed description below, illustrate embodiments of concepts that include the claimed disclosure, and explain various principles and advantages of those embodiments. The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

The present disclosure is generally directed to configurations of separation devices that are utilized to separate a particular component from a fluid; either gas, liquid or solid particles that have fluidic characteristics. Separation layers deploy spacers to create walls and form channels for the fluids to flow though the separation device.

Figure 1:
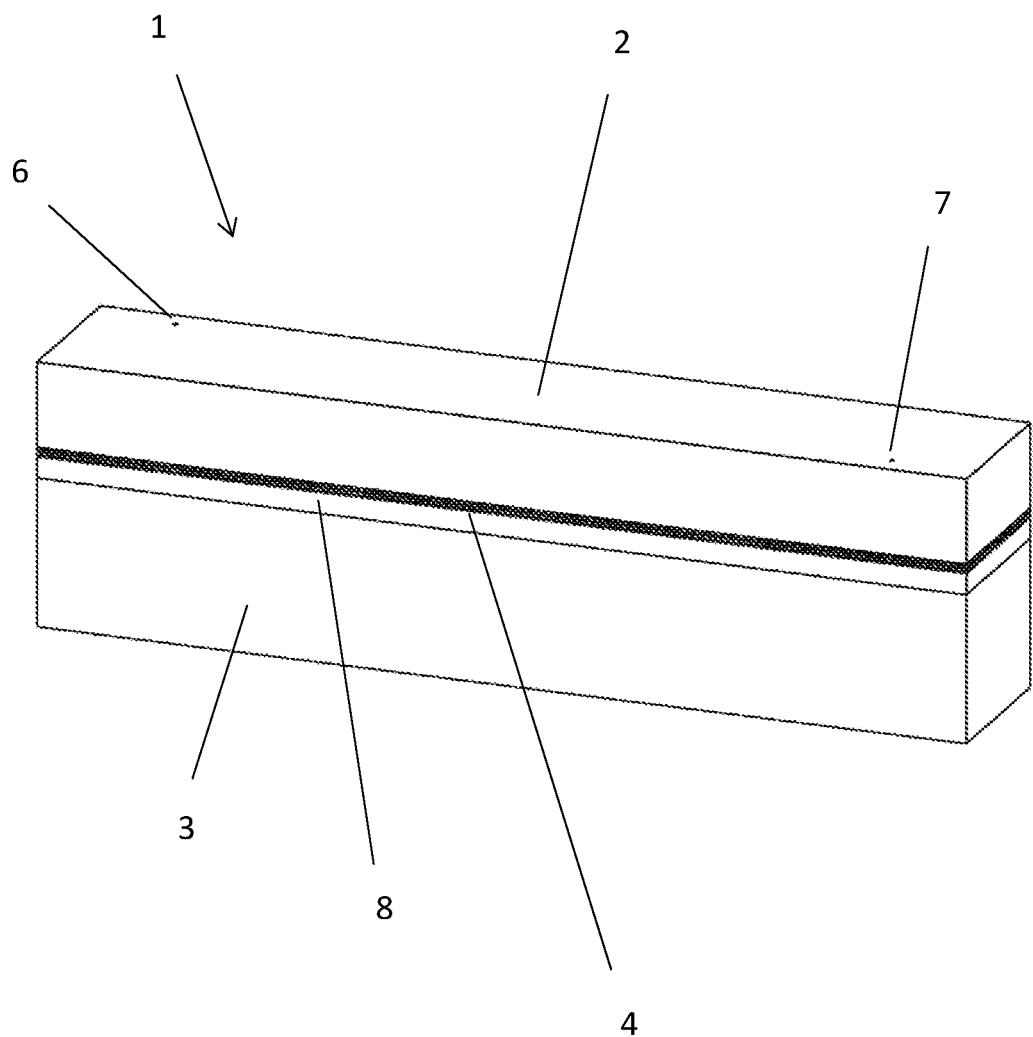
FIG. 1 is a perspective view of a separation device.

Referring first to FIG. 1, the separation device 1 is shown with a top cover 2 and a substrate 3. The top cover 2 and the substrate 3 secure multiple separation layers 4 and an isolation layer 8 in their proper positions. The separation layers 4 and the isolation layer 8 are typically formed via a deposition process with semiconductor manufacturing equipment. While the present disclosure will suggest one set of materials for the device, it should be noted that many different materials could be substituted to accommodate manufacturing requirements specific to individual implementation parameters.

The layers 2, 3, 4, and 8 are bonded to one another by the deposition process. They may also be clamped in position via additional components (typically layers). One skilled in the art of housing design could conceive of many other variations to ensure these components remain bonded and mated in their proper positions to ensure their proper operating conditions. All the layers are enclosed in a housing when the device 1 is installed.

Figure 2:
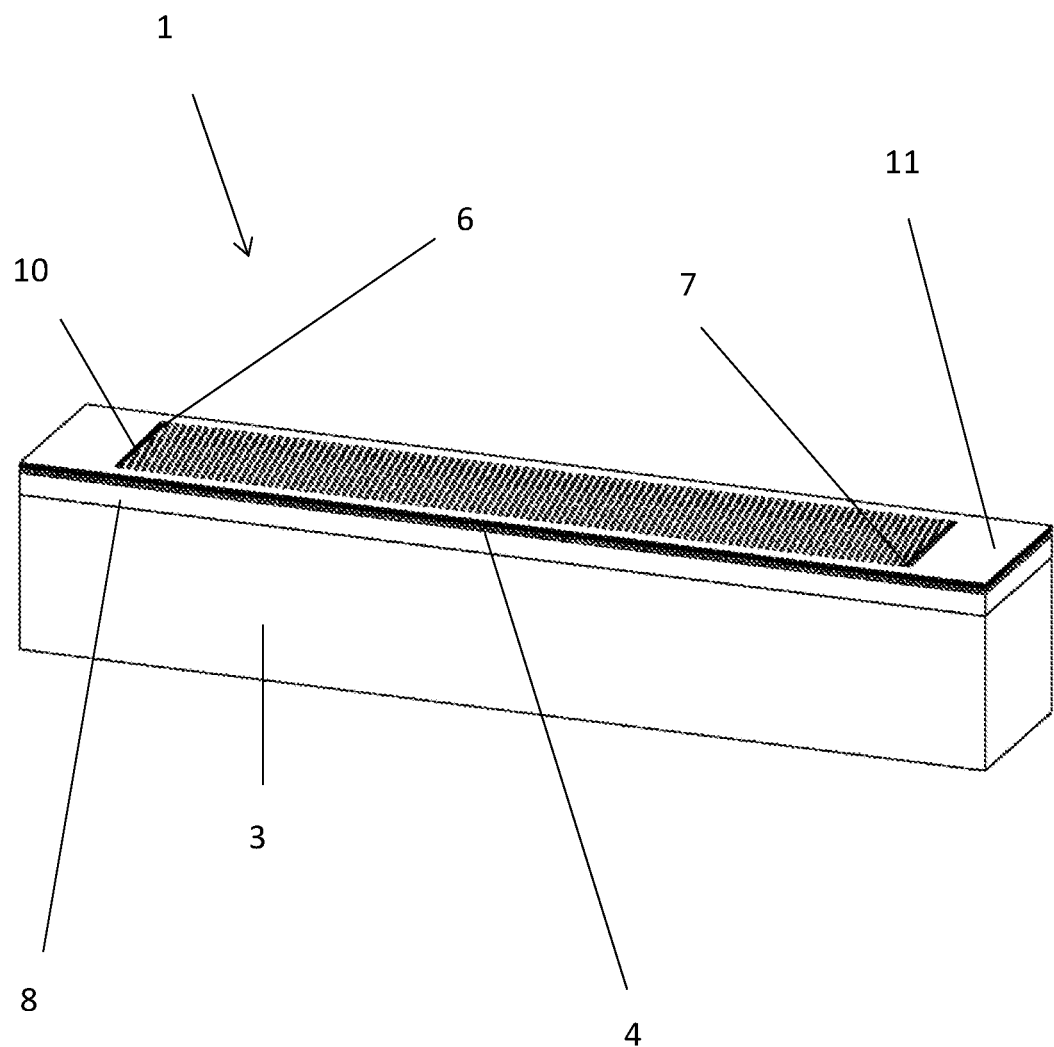
FIG. 2 is a perspective view of the separation device shown in FIG. 1 with the top cover removed to expose the internal components.

The top cover includes an inlet port 6 and an outlet port 7. The inlet 6 and outlet 7 ports direct fluids to and from the internal inlet 10 and outlet 11 plenums that are positioned inside the separation device 1 as shown in FIG. 2. For many applications, the separation device 1 is operated at high pressure. It is important to note that the separation device 1 needs to be engineered to endure these high pressures.

Figure 3:
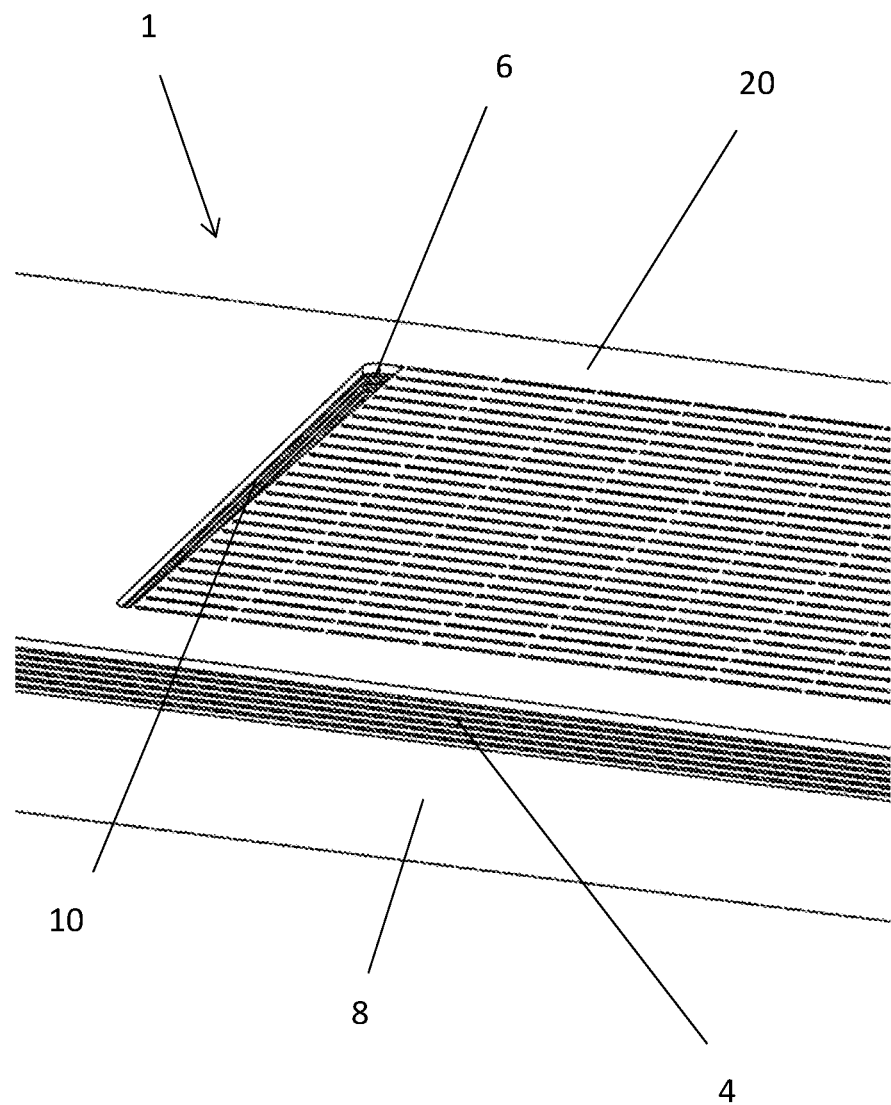
FIG. 3 is a more detailed perspective view of the internal components illustrated in FIG. 2.

In FIG. 2 and FIG. 3 the top cover 2 has been removed so as to readily illustrate the internal components and the details of their construction and their positions relative to the entirety of the separation device 1.

Referring now specifically to FIG. 3, the inlet plenum 10 is shown as a trapezoid shaped volume. The base of the trapezoid inlet plenum 10 extends across most of the width of the separation layers 4. The significance of the geometry of the inlet plenum 10 will be discussed later in this disclosure. The inlet port 6 is located above the wider end of the inlet plenum 10 and delivers fluid to the inlet plenum 10. The fluid flows from the inlet port 6 to the inlet plenum 10 and then to the separation layers 4.

Figure 4:
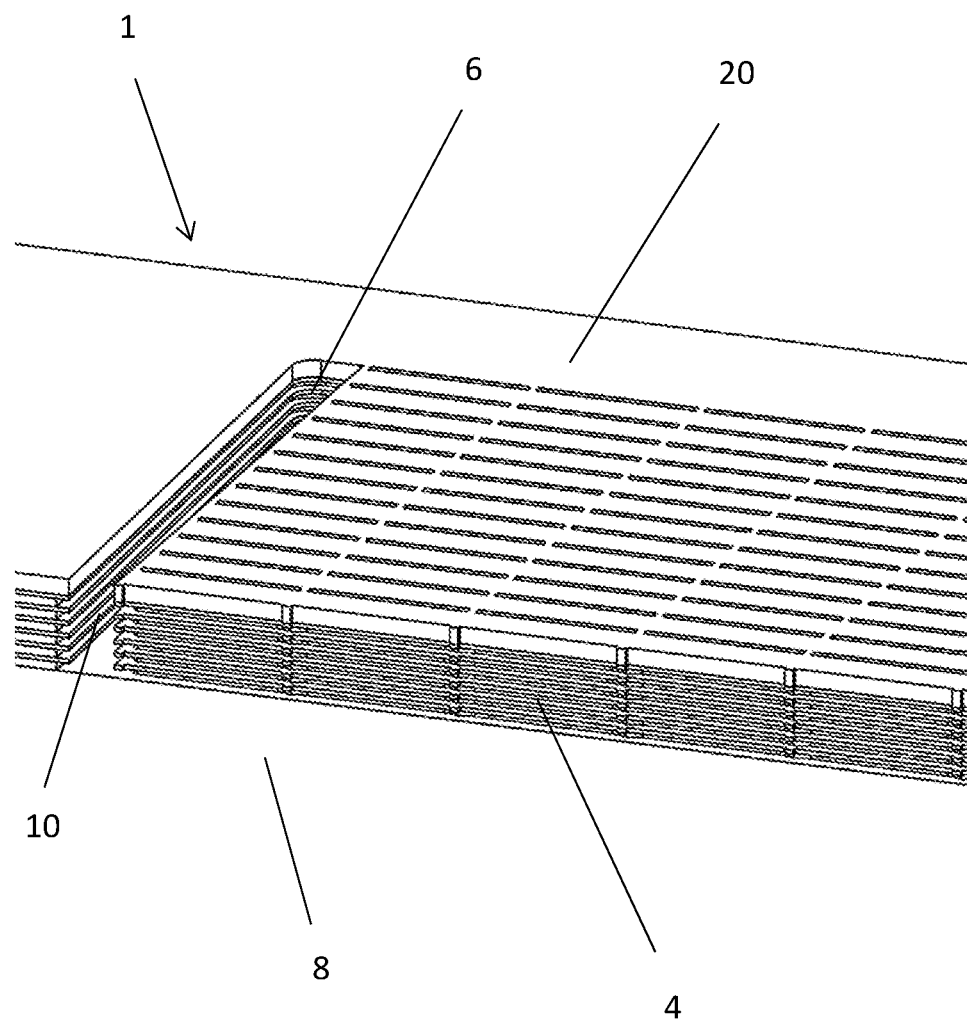
FIG. 4 is a broken sectional view of a plurality of separation panels layered on top of each other.
Figure 5:
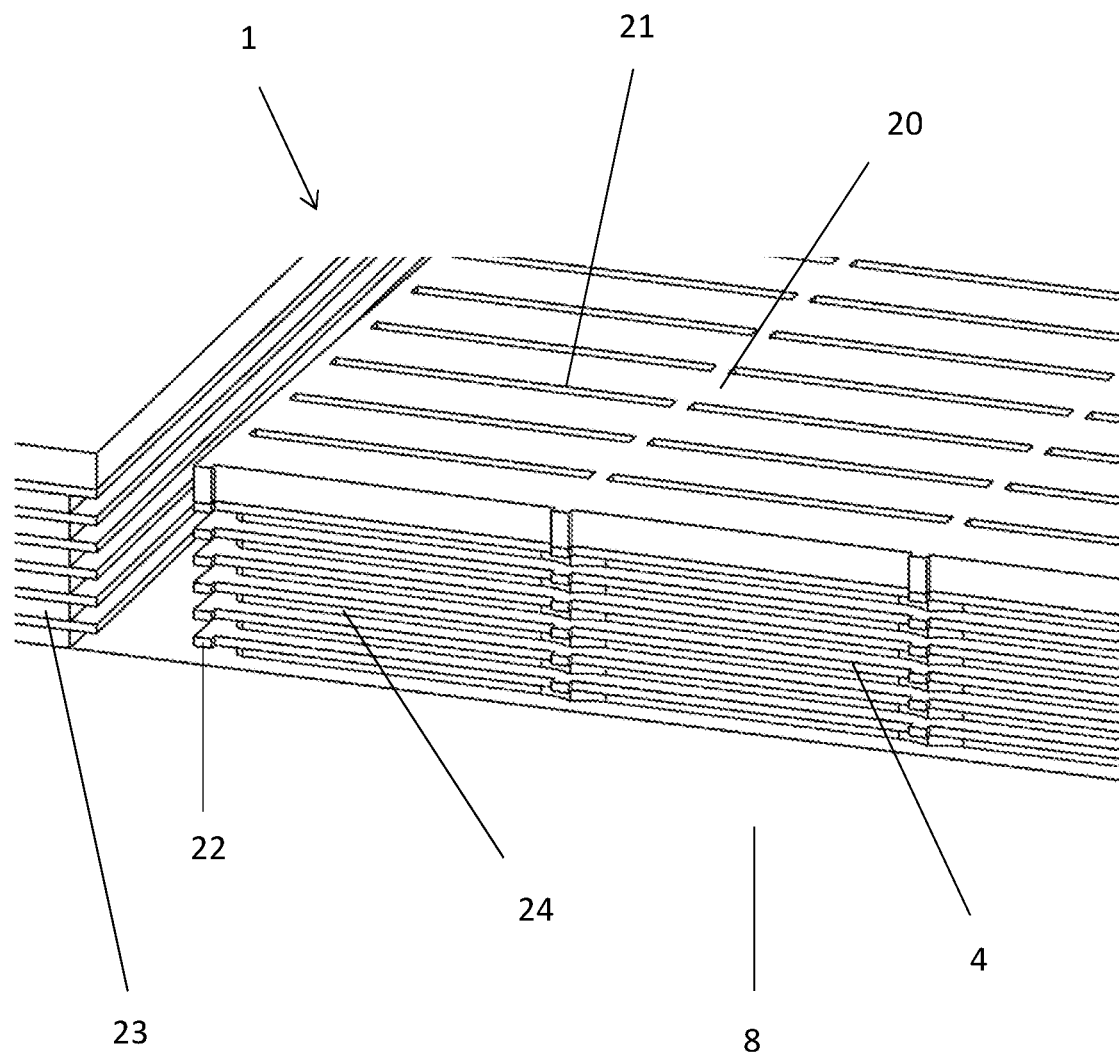
FIG. 5 is a more detailed view of the panels shown in FIG. 4.

The details of the separation layers 4 can be seen in FIGS. 4 and 5. The separation layers 4 include multiple main layers 22 (see FIG. 5) and a corresponding number of spacer layers 23. A first one of the spacer layers 23 is positioned directly on top of the isolation layer 8. The spacer layers 23 are formed from bars of material that support the main layers 22. The openings between the spacer bars 24 form channels that receive fluid flow from the inlet plenum 10, and allow the fluid to flow to the outlet plenum 11. Alternating separation layers 4 formed from spacer 23 and main 22 layer pairs are stacked on top of one another. Although most of the drawings herein illustrate six separation layers 4—stacked pairs of spacer 23 and main 22 layers—an actual working separation device would typically have many more layers. The number of layers in an average working separation device would be in the hundreds or even thousands. The number would depend completely on the requirements of a particular implementation of the separation device 1. For visual clarity in the drawings herein, only six layer pairs are shown.

A photoresist layer 20 is deposited on top of the stacked pairs of separation layers 4. The photoresist layer 20 is required for fabrication of the separation device 1. The photoresist layer 20 is not necessarily required for function of the device 1. The photoresist layer 20 can be removed before the top cover 2 is bonded or clamped to the stacked pairs of separation layers 4. The photoresist layer 20 extends over the entire upper surface of the separation layers 4 except at the inlet plenum 10, at the outlet plenum 11, and at photoresist slots 21. The photoresist slots 21 extend through the separation layers 4 down to the insolation layer 8. The photoresist slots 21 are arrayed over the photoresist layer 20 between the inlet plenum 6 and the outlet plenum 11. The purpose of the photoresist slots 21 will be discussed below.

Figure 6:
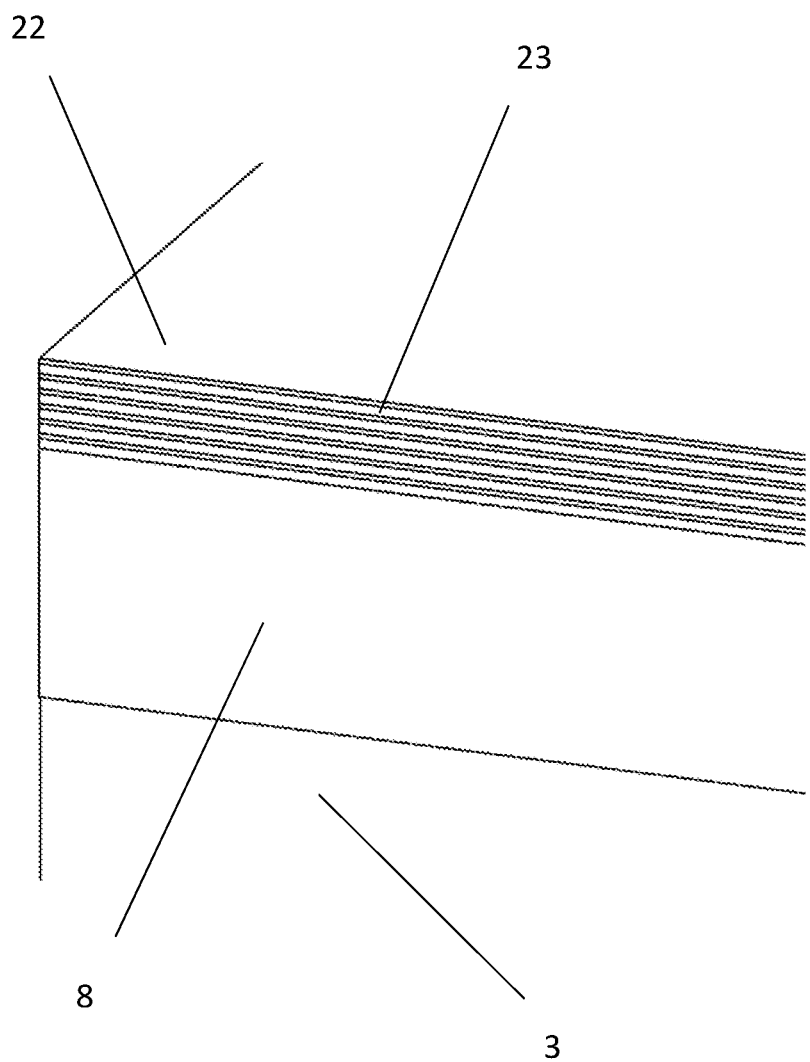
FIG. 6 shows an outlet section of the separation panel.

The unique configuration of the aforementioned components is best understood by considering their fabrication process. FIG. 6 shows an initial step of the fabrication process. The substrate 3 and the isolation layer 8 are contiguous structures with no voids. At this stage of fabrication, the main layers 22 and spacer layers 23 are solid layers with no slots or cuts therein. One possible material (of many) that can be used for the main layers 22 is silicon nitride. One possible material (again, of many) that can be used for the spacer layers 23 is silicon. These materials are commonly deposited using semiconductor processing equipment. The material for the main 22 and spacer 23 layers can both be deposited with one piece of equipment by changing the deposition conditions. Therefore, the main and spacer layers 22 and 23 can be fabricated in a very cost-effective manner. Depending on the application and the intended purpose of the separation device, the main layers 22 might be 50 nm to 100 nm thick. Thinner main layers 22 reduce manufacturing time but also reduce strength of the structure. The thickness of main layers 22 has only a secondary effect on separation performance. The spacer layers 23 might be in the range of 100 nm to over 1 micron thick. The thickness of the spacer layers 23 does have a significant effect on the separation performance, as this defines the flow capabilities. Thicker layers are more expensive to fabricate, typically reduce the separation performance, and reduce the overall inlet port 6 to outlet port 7 pressure differential. The selection of the layer thickness would be an engineering decision based on the needs of the specific application of the separation device 1.

Figure 7:
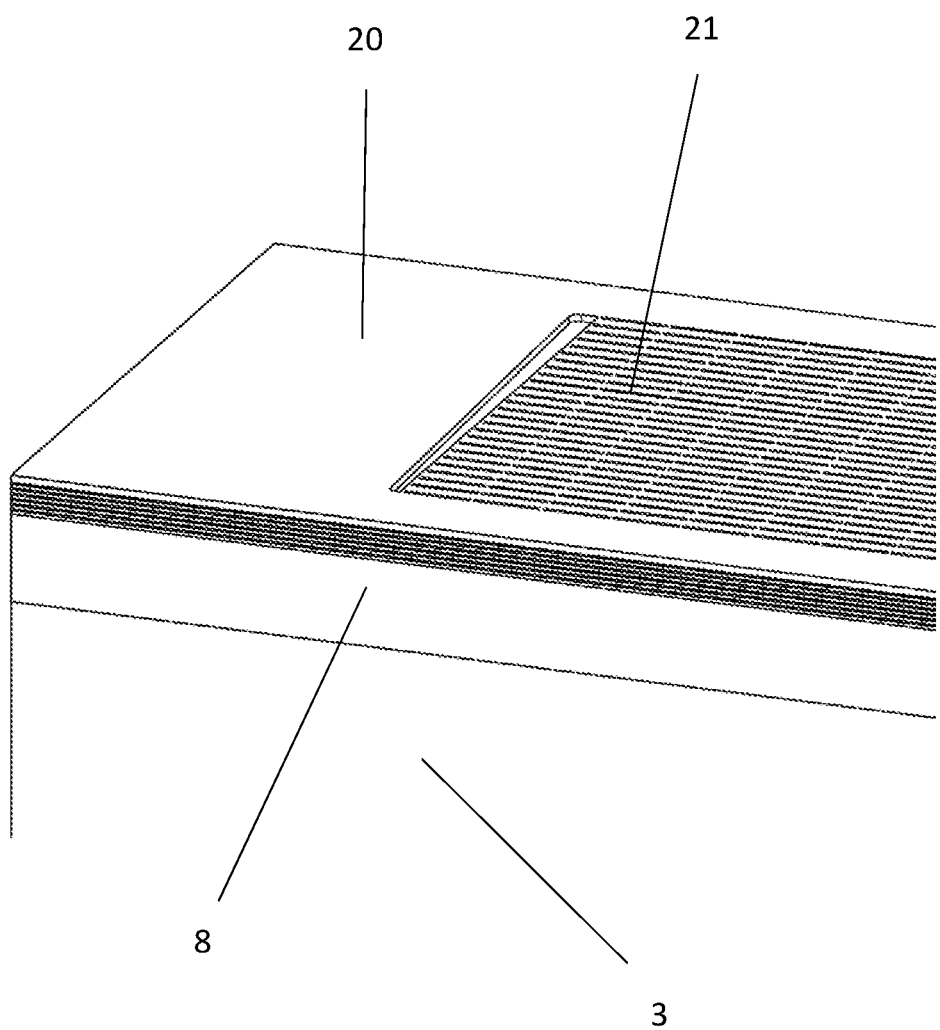
FIG. 7 shows the device section shown in FIG. 3 during an early processing stage of formation of the device.

The photoresist layer 20 may be applied to the top of the layer stack, specifically on top of the uppermost main layer 22. In FIG. 7, the photoresist layer 20 is shown in its fully developed state in which photoresist slots 21 have been created. The details of depositing and creating photoresist structures is well known in the semiconductor industry and is therefore not discussed in detail here.

Figure 8:
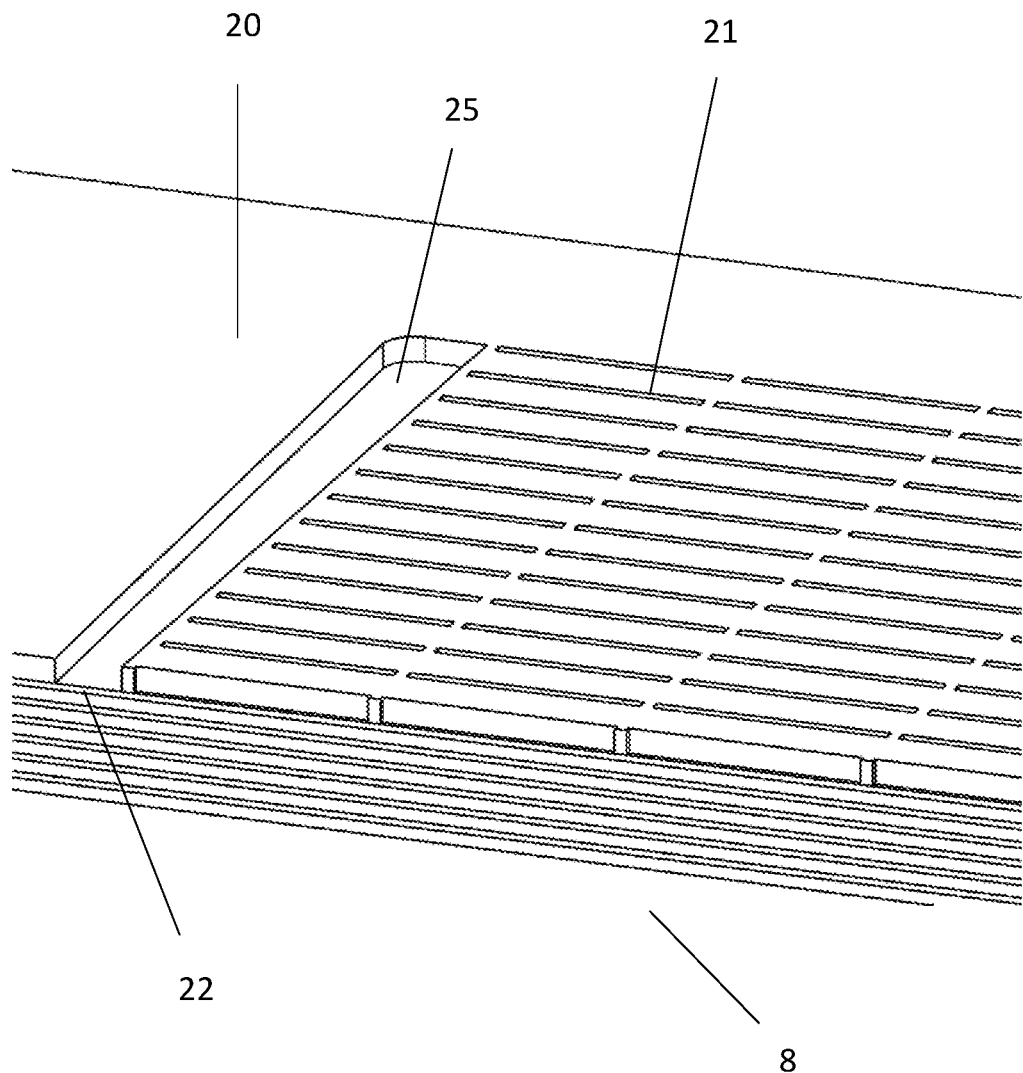
FIG. 8 shows the device section shown in FIG. 7 at a successive processing step.
Figure 9:
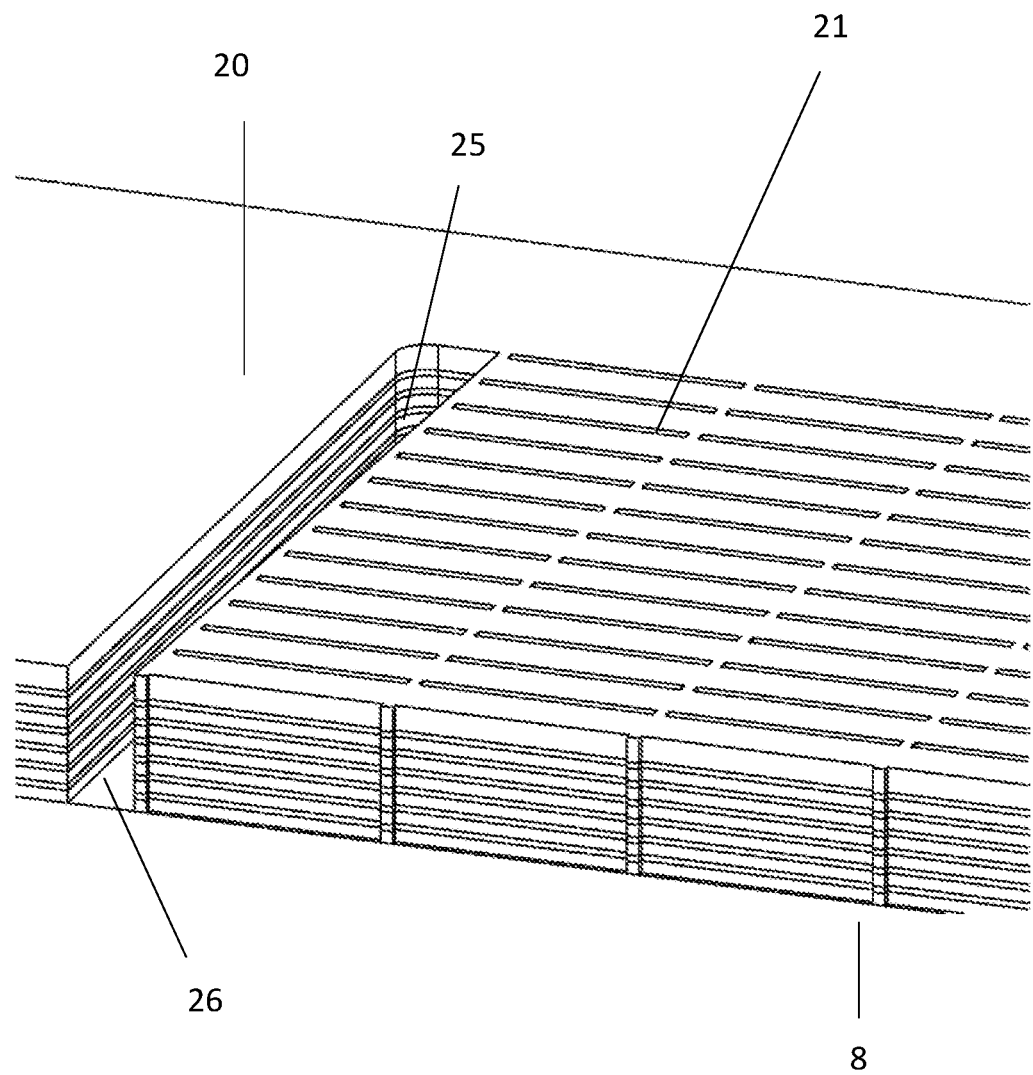
FIG. 9 shows the device section shown in FIG. 8 after further processing.
Figure 10:
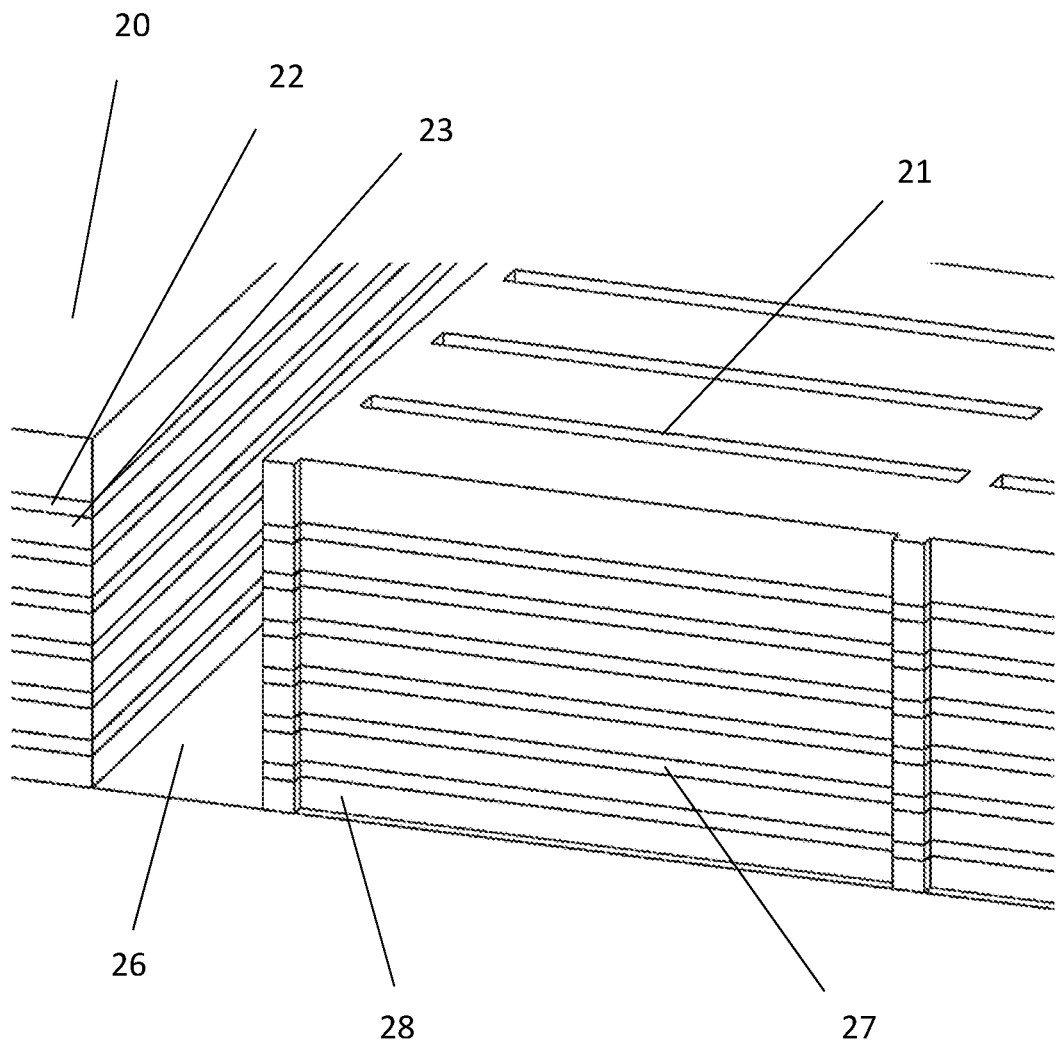
FIG. 10 shows a more detailed view of the device section illustrated in FIG. 9.

Referring now to FIGS. 8, 9, and 10, the details of the photoresist process step can be seen. FIG. 8 shows the point in manufacturing where the photoresist slots 21 terminate at the uppermost main layer 22. The next step in the fabrication process is the etching of the main layers 22 and the spacer layers 23. The result of this step can be seen in FIG. 9. Etching does not significantly damage the photoresist layer 20 but does etch the main layers 22 and the spacer layers 23. The etching process is highly directional and forms trenches in the main layers 22 and the spacer layers 23 that have the same width and length as the photoresist slots 21. The width and length of the photoresist slots are etched through the main layers 22 and the spacer layers 23 down to the isolation layer 8. Some etching of the isolation layer 8 may occur during the process. No etching in the isolation layer 8 is shown in the drawings as none is required for the separation function. A closeup of the processed layers can be seen in FIG. 10.

Figure 11:
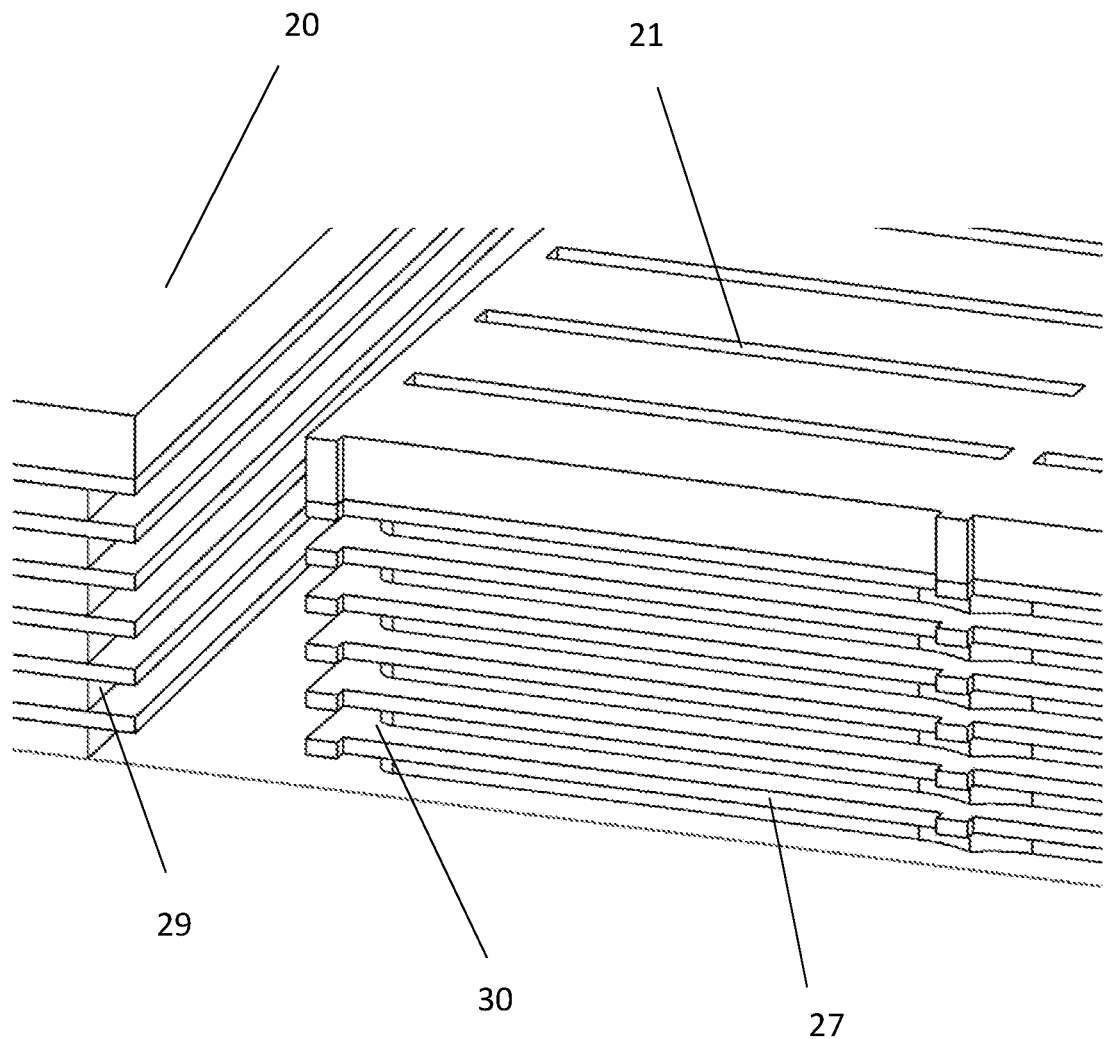
FIG. 11 illustrates the device section shown in FIG. 9 after still further processing.

The result of what is generally the last process step in the etching process is shown in FIG. 11. A secondary etch of the photoresist layer 20 and separation layers 4 attacks only the spacer layers 23. In the secondary etch, the etch is not directional. With this process the material of the spacer layers 23 is removed in all directions at the point where the surface is exposed by the photoresist slots 21 and the etched plenums 26. The etching process creates channels adjacent to the photoresist slots 21 and the slots created by the first etch through the main layers 22 and the spacer layers 23. The etch also etches any spacer material in the etched plenums 26. This is not required for the fluidic performance. As mentioned earlier the separation layer 23 is silicon and the main layer 22 is silicon nitride. Both of these materials can easily be etched with a deep reactive ion etch (DRIE) process to create the slots in the first etch process. For the secondary etch, silicon is etched with XeF2 while silicon nitride is not.

It should again be noted that the materials suggested herein for the separation device 1 are for reference only, and are clearly not the only materials that could be used for the separation device 1. One skilled in the art of semiconductor manufacturing could engineer a separation device 1 using various other types of materials. For example, silicon dioxide could be used for the spacer material. If silicon dioxide was used, the secondary etch process would have to utilize something other than $XeF_2$, as $XeF_2$ does not etch silicon dioxide.

Figure 12:
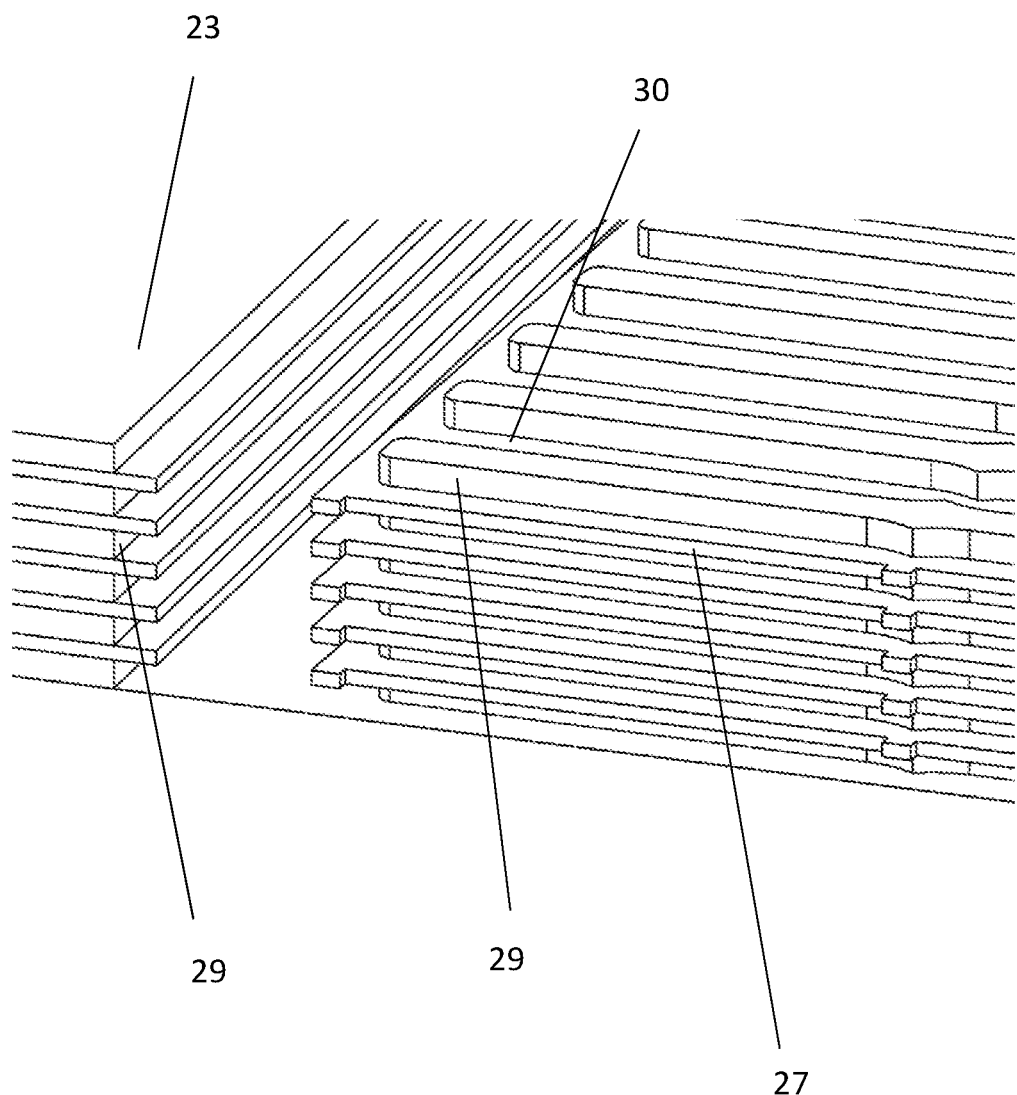
FIG. 12 depicts the same device section as shown FIG. 11 with a portion of the layers removed to more clearly show internal components.
Figure 13:
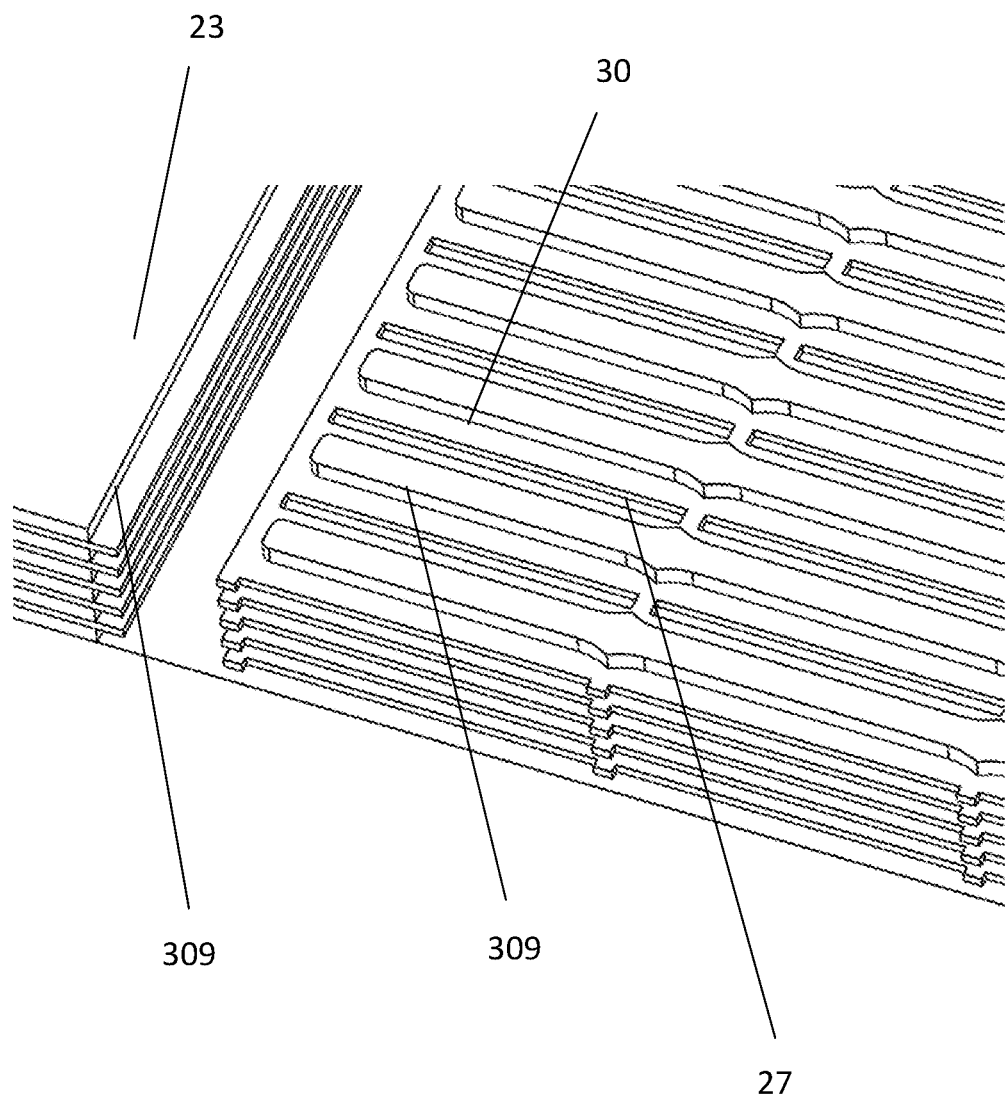
FIG. 13 shows the same device section as that elements shown in FIG. 12 but from a slightly different perspective so that the etching results may be seen more clearly.

Referring now to FIGS. 11, 12, and 13, the relationship between the slots and etched areas can be seen. Referring specifically to FIG. 13, channels 30 can be seen. The channels 30 facilitate fluid flow from the inlet plenum 10 to the outlet plenum 11. The outlet area is not shown in detail. The channels 30 originate at the inlet plenum 10 and terminate at the outlet plenum 11. From the perspective illustrated in FIG. 13 one can readily see the slots in the main layer created by the first etch and the creation of the channels 30 by the secondary etch. In the secondary etch, the etch fluid flowed through the slots 21 to access the spacer material and create the channels 30.

Figure 14:
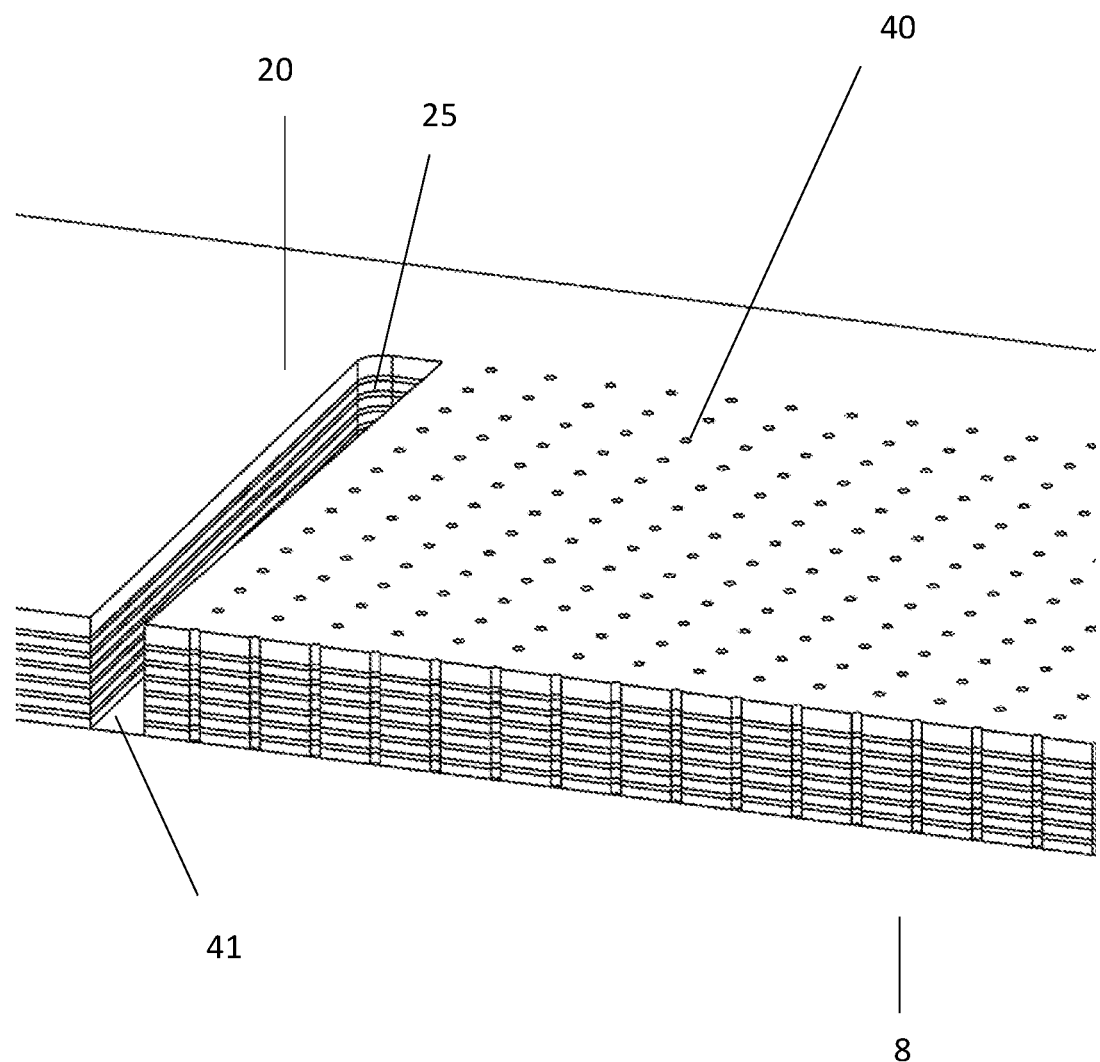
FIG. 14 is a closeup section view of an alternate embodiment of the invention before a terminal processing step.
Figure 15:
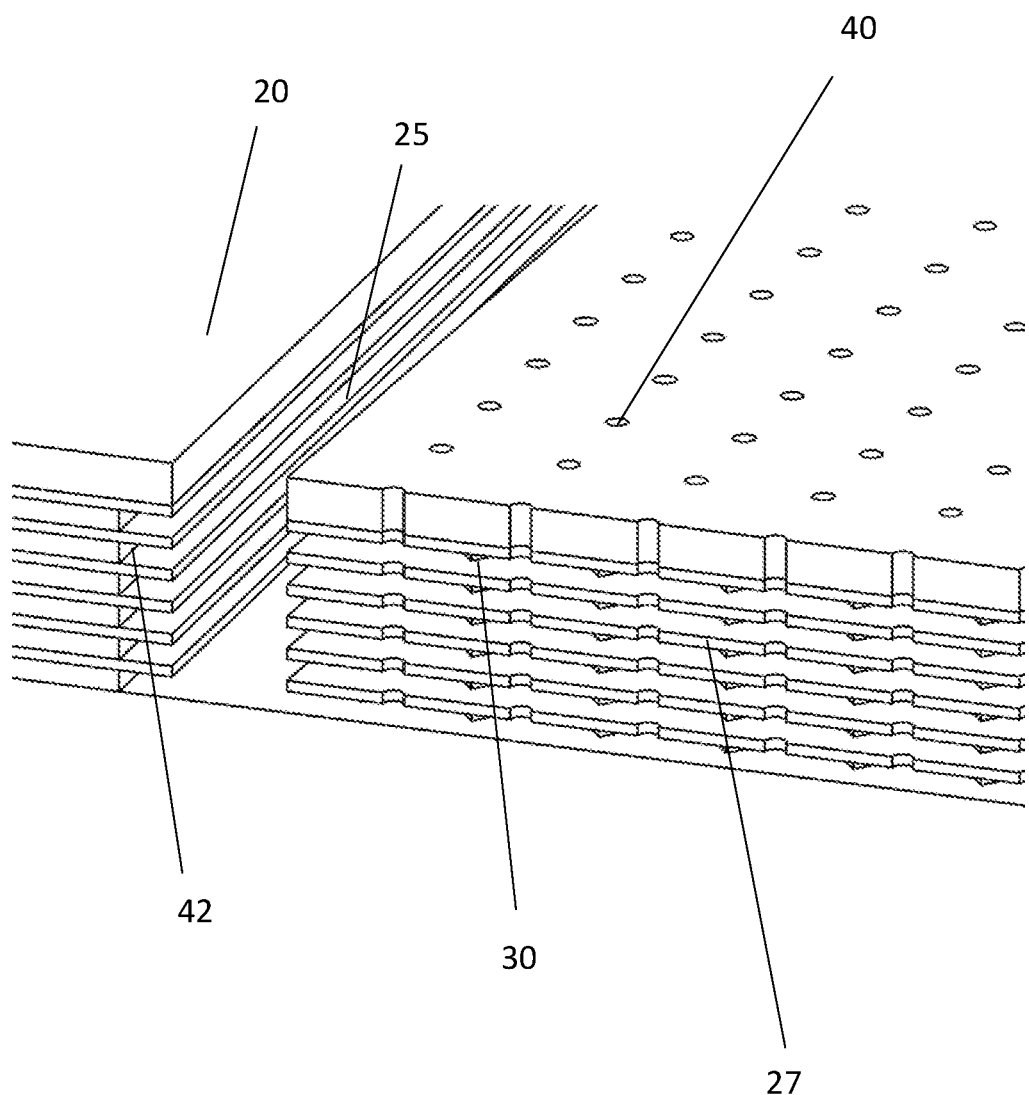
FIG. 15 shows the same device section elements as those illustrated in FIG. 14 after final processing.
Figure 16:
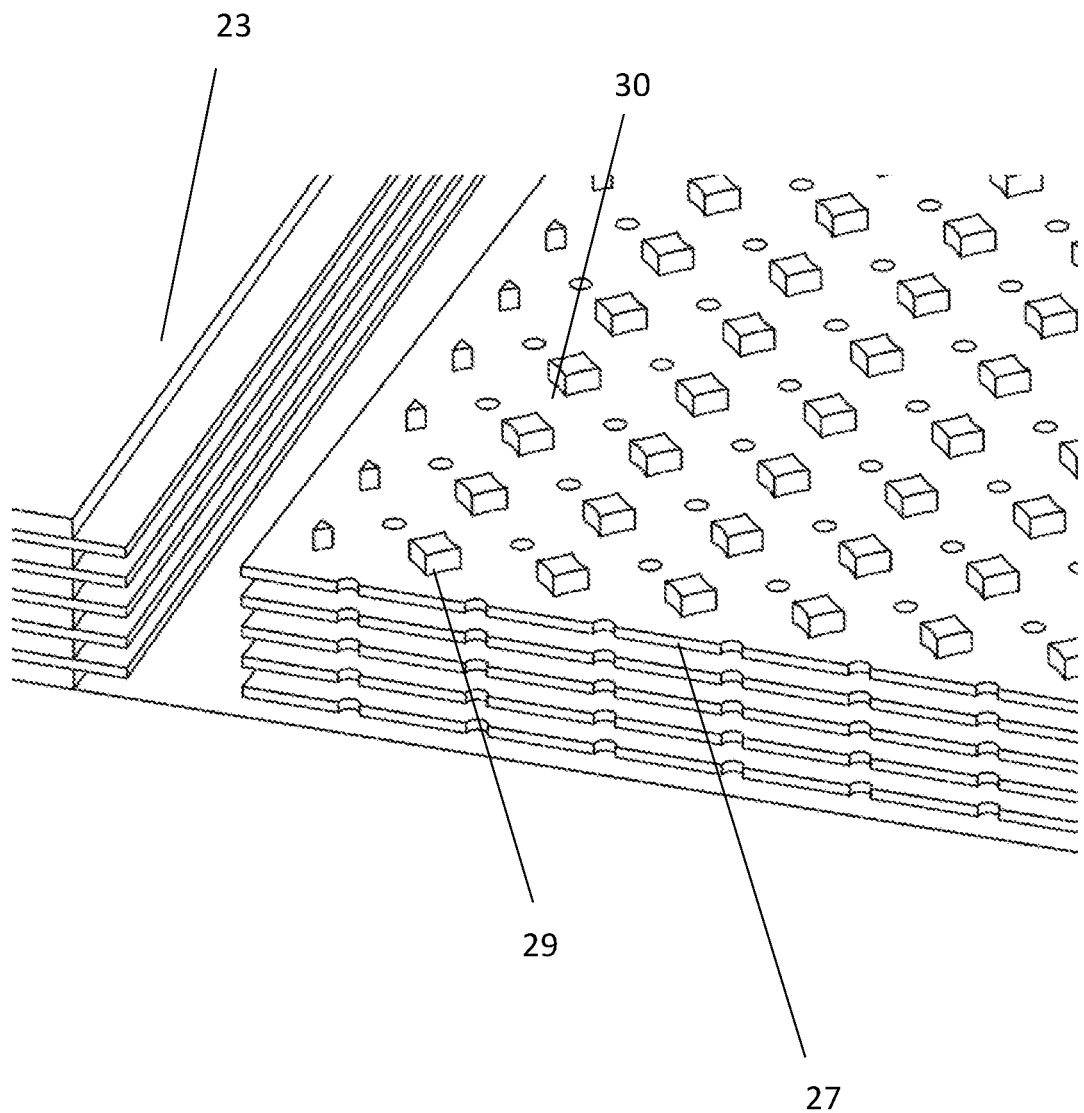
FIG. 16 shows the same device section elements as those illustrated in FIG. 15 with a portion of the layers removed to more clearly show internal components.

FIGS. 14, 15, and 16, illustrate an alternate embodiment of a separation device. The process steps to fabricate the alternate embodiment are the same as those utilized in the embodiment described above. The only difference between the embodiment shown in FIGS. 14, 15, and 16 and the embodiment described above is that the geometry chosen for the openings in the photoresist layer 20 are holes 40 rather than slots. The corresponding features in the main layers and spacer layers therefore have a circular shape rather than the slots described above. The resulting spacer shape is shown in FIG. 16.

Figure 17:
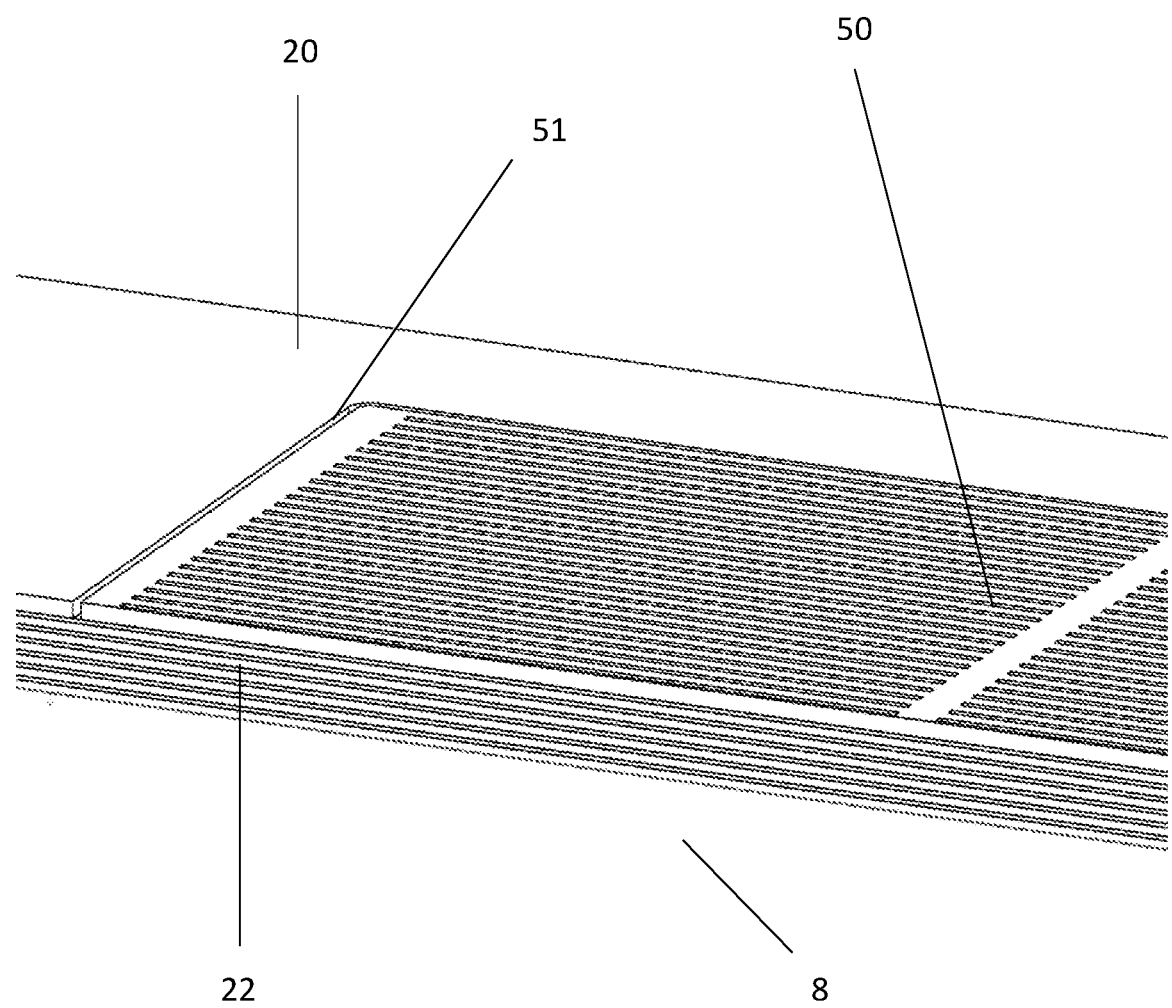
FIG. 17 is a closeup section view of a second alternate embodiment of the device at an initial stage of processing.
Figure 18:
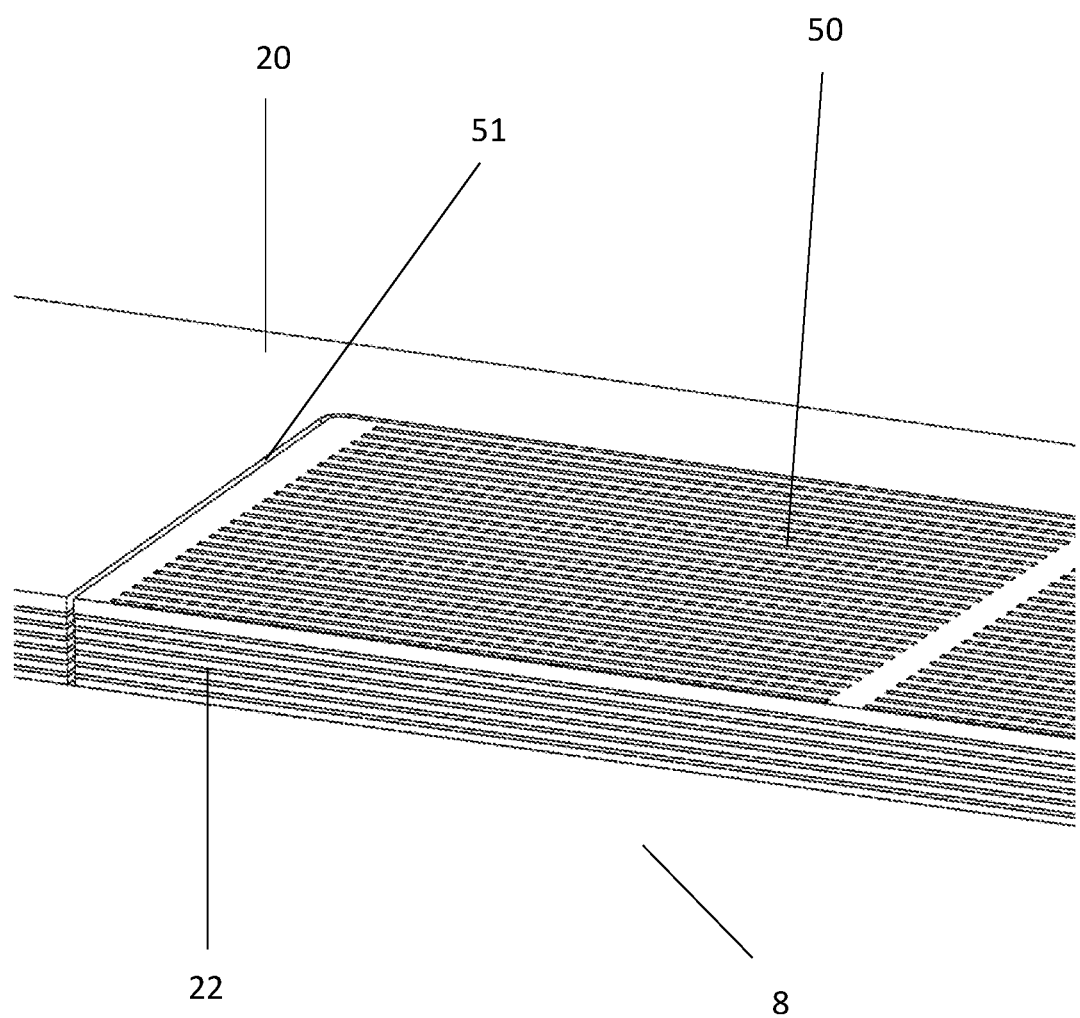
FIG. 18 shows a successive processing step of the device shown in FIG. 17.
Figure 19:
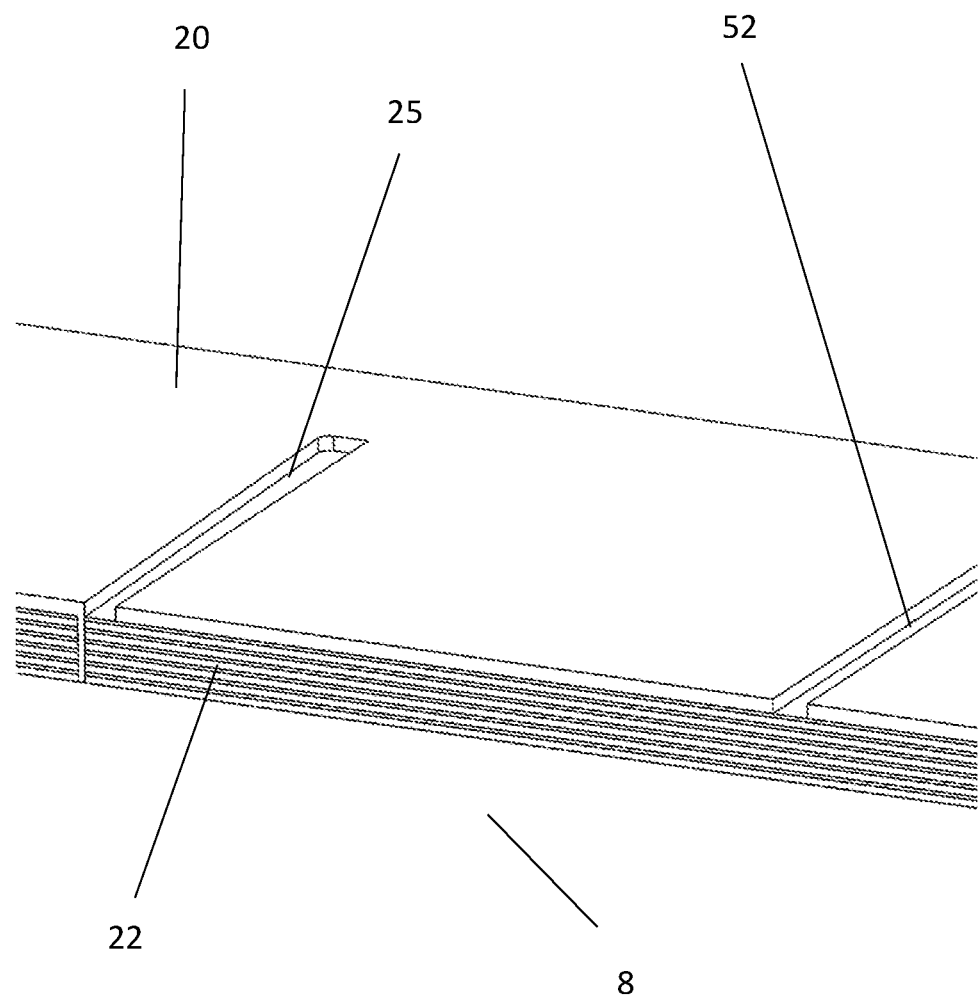
FIG. 19 illustrates a successive processing step of the device shown in FIG. 18.

FIGS. 17 through 22 illustrate another alternate embodiment. This embodiment discloses structures fabricated with additional etching process steps. FIG. 17 shows photoresist applied to the stacked main and spacer layers. The configuration of the photoresist slots 50 and the photoresist grooves 51 define the shape of the etched structures in the main layers 22. FIG. 18 shows the main and spacer layers after etching. All of the features shown in the photoresist layer 20 are etched through all of the main layers and the spacer layers. The photoresist groove can be seen extending down to the isolation layer 8. FIG. 19 shows the application of a second layer of photoresist. This photoresist serves two purposes, the filling of the slots created in the first directional etch process and the creation of new slots for a second directional etch process. Photoresist cuts 52 allow the etching of channels in following process steps.

Figure 20:
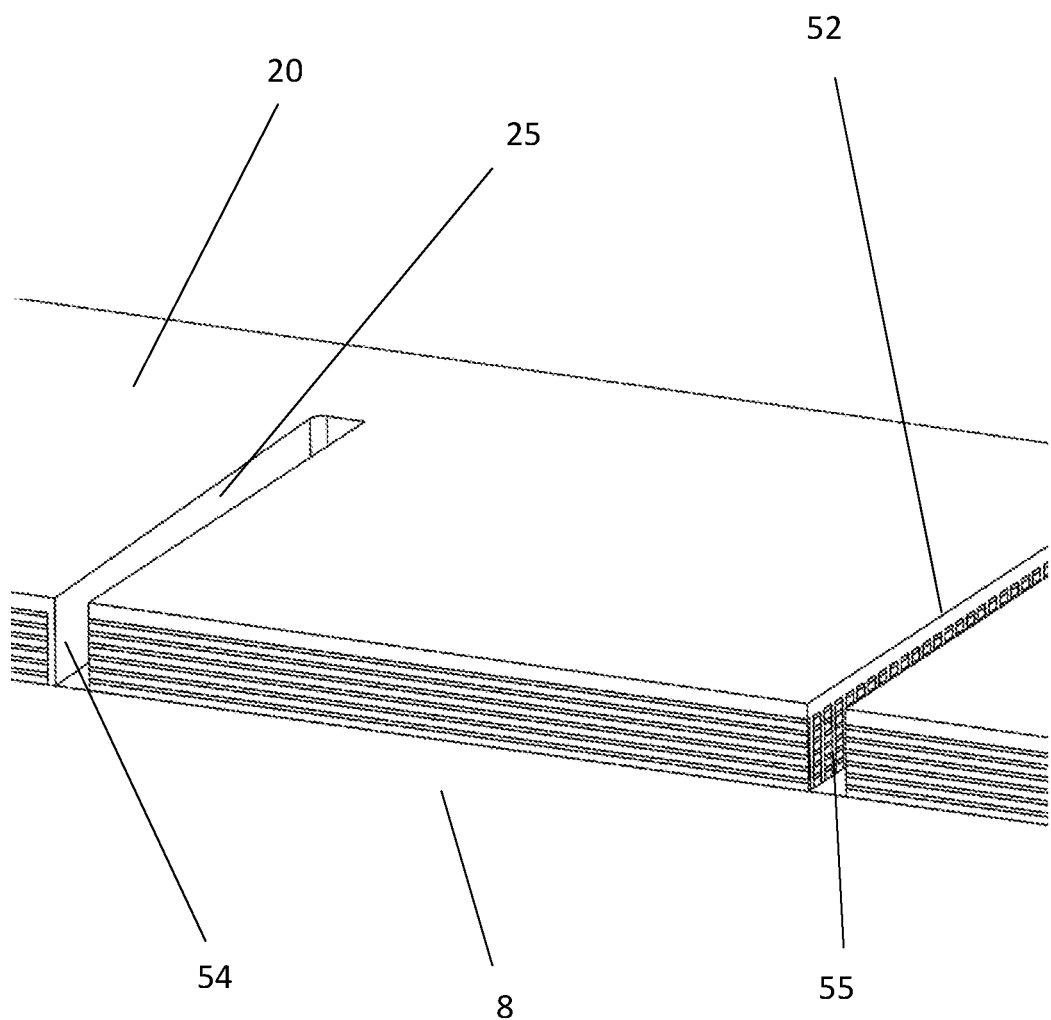
FIG. 20 is a successive processing step of the device shown in FIG. 19.
Figure 21:
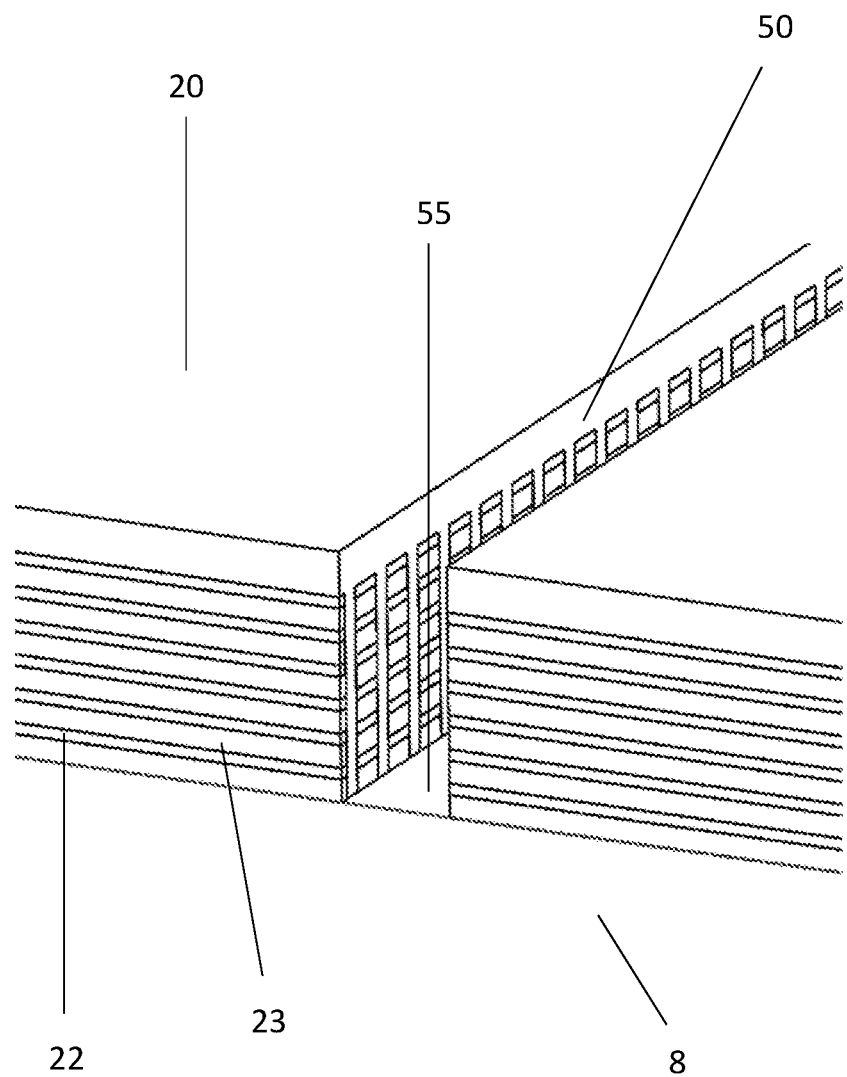
FIG. 21 is a more detailed view of the etched cuts in the device section shown in FIG. 20.

FIG. 20 illustrates the main and spacer layers having been etched with the second directional etch process. Note that the second photoresist material remains in the slots created by the first etch process. Also note that in some areas the second photoresist hides the main and spacer layers and in some cases it does not. FIG. 21 shows the area where the lack of photoresist exposes the etched main and spacer layers resulting in etched cut 55.

Figure 22:
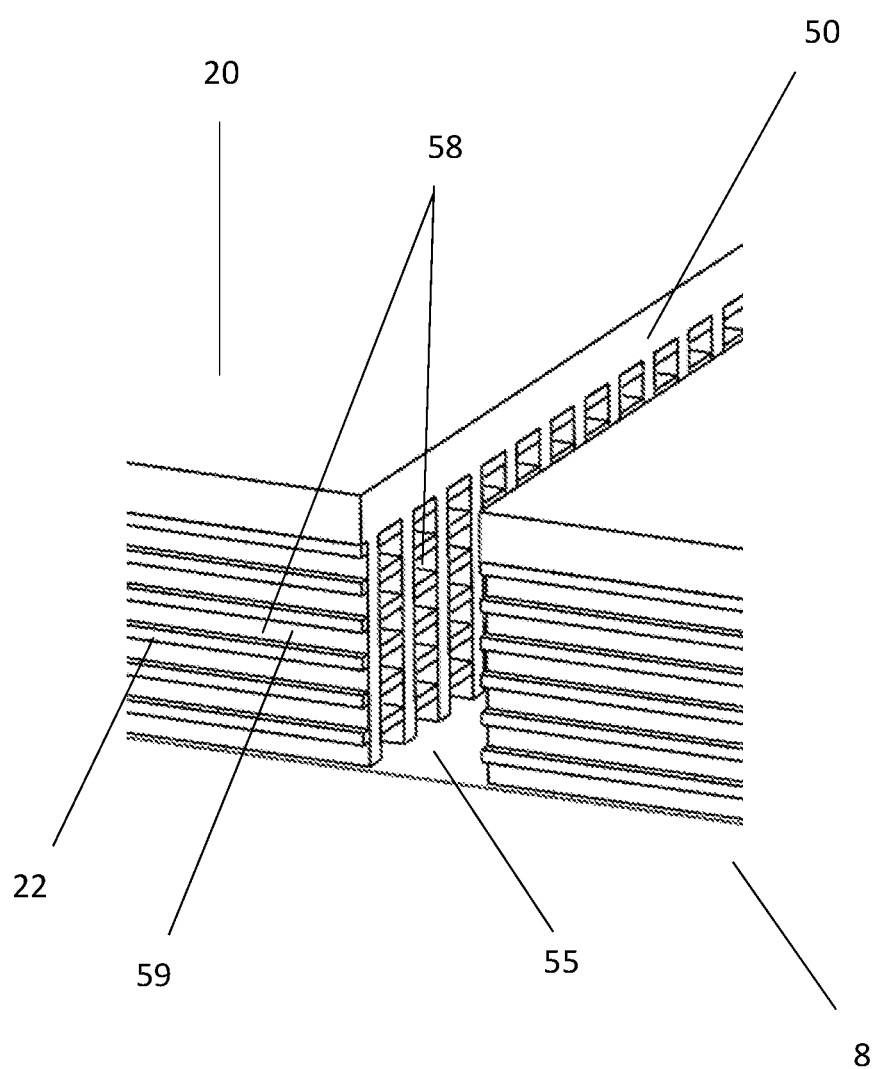
FIG. 22 shows the device section illustrated in FIG. 21 after a further processing step.

FIG. 22 shows the separation layers after a third and final etch. In this etch the silicon is the only material attacked by $XeF_2$ gas. The etching of the silicon spacer material 59 creates channels 58. The main layers are supported by the previously applied photoresist material that filled the slots created by the first etch.

All three of the embodiments disclosed above create generally equivalent fluid flow paths.

Figure 23:
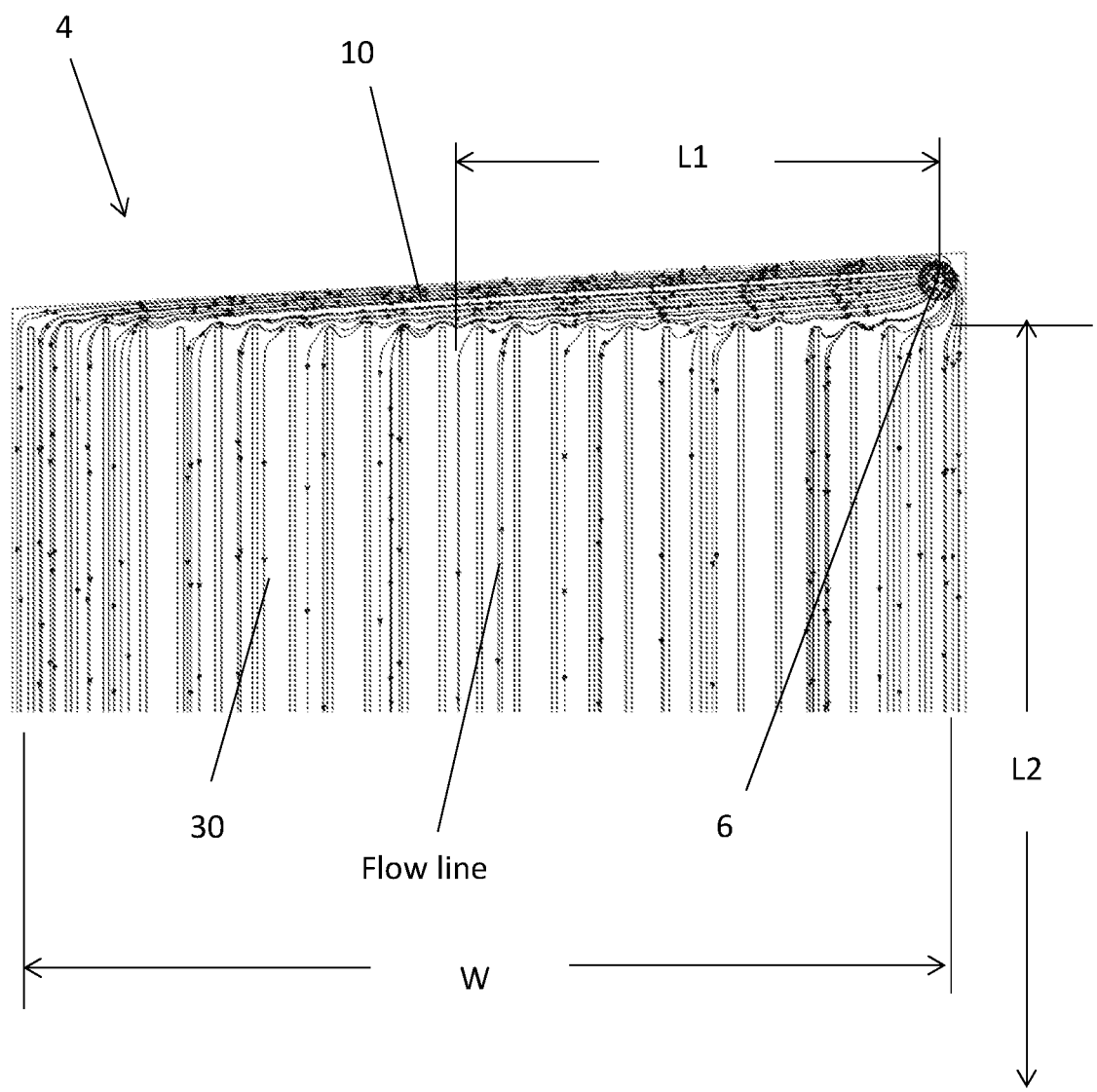
FIG. 23 is a top view of the inlet section of the device showing flow lines as fluids flow through the device.
Figure 24:
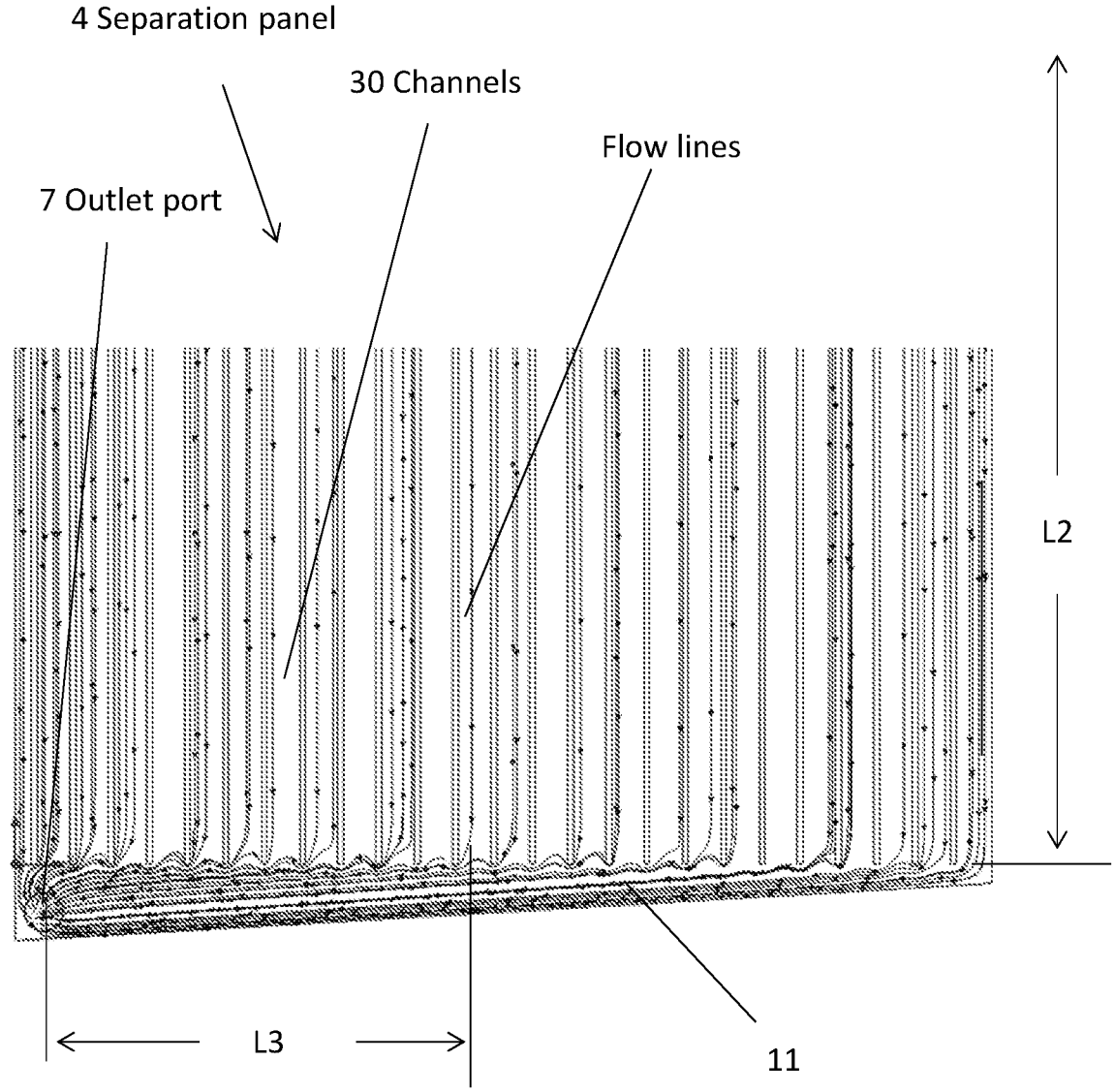
FIG. 24 is a top view of the outlet section of the device showing flow lines as fluids flow through the device.

Referring now to FIGS. 23 and 24, flow lines formed by the mechanical components of the separation device 1 are illustrated. In FIGS. 23 and 24, fluid flow from the inlet port 6 can be seen flowing across the inlet plenum 10 to the channels 30. The inlet plenum 10 supplies the channels 30 at generally equal pressures. The length, width, and height of each of the channels 30 are nearly identical to each other. This is due to the accuracy of semiconductor processing (the etching process). Dimensional consistency of the resultant structures can be controlled to within a few nanometers. The configuration of the inlet plenum 10 and the consistent size of the channels 30 produces generally equal flow in all the channels 30. For many separation devices this is a highly desirable property.

The fluid flow lines shown in FIGS. 23 and 24 depict the flow of fluids through the plenums and channels 30. With some separation operations it is desirable that the length of all the fluid flow paths be as close to equal as possible. The configuration shown in FIGS. 23 and 24 provides generally equal path lengths. As shown in FIG. 23, the inlet port 6 is located at the upper right-hand corner of the inlet plenum 10 and directs fluid flow into the inlet plenum 10. FIG. 24 shows the exit section of the flow. The path length of the flow generally equals the distance the fluid flows to the left from the inlet port 6 to the point of exit at the outlet plenum 11. The flow path length is L1 plus the total length of the channel, L2 plus the length from the exit of the fluid from the channel to the exit, L3. In all cases L1 plus L2 equates to the width between the inlet and outlet of the device, W. Both L2 and W are constant. Therefore, the path length for all flow paths through the system are generally equal.

FIGS. 23 and 24 show a separation device with generally equal length and width. With prior art packed bed separation devices, the width of the device is much smaller than the length. This is required because of variations in the restriction across the flow path. These variations are due to the variation in the dimensions of the packed bed components. This aspect ratio results in the need for very high pressure for operation. The disclosed invention allows for a more desirable architecture where the width is comparable to, or may even be greater than, the length.

The diffusion rate of the components in the fluid and the velocity of the flow are the main factors that drive the choice of channel dimensions. Smaller dimensions are typically preferred for separation devices. Smaller dimensions create more surface area for attraction within a device. Smaller dimensions also produce a smaller distance for a component to diffuse to and be retained at a surface. Typical state of the art for high pressure liquid chromatography (HPLC) separation devices is on the order of 1.5 micron to 2 microns spherical elements. Manufacturing and flow constraints limit the size of current art devices. These constraints do not affect the configurations disclosed herein. With current semiconductor processing equipment and the processing described herein, one atomic scale features can be created.

Figure 25A:
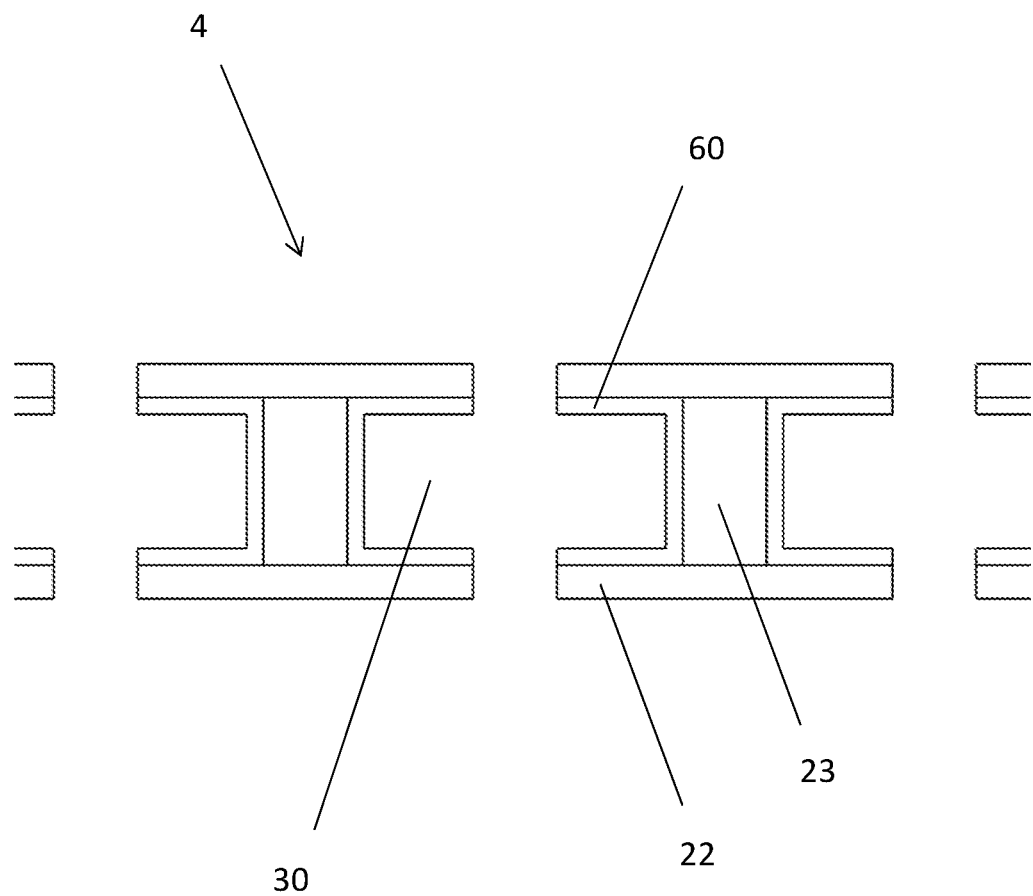
FIGS. 25A, 25B and 25C are cross section views of the channels typically found in various embodiments formed according to the present disclosure.

FIG. 25A shows a cross section of a typical separation layer 4. As mentioned above semiconductor materials might be used for the separation layers 4. A particular semiconductor material that may be ideal for the manufacture of separation layers 4 might not be ideal for the separation of compounds in the subject solution. To alleviate this problem a material ideal for separation is applied to the surface of the separation layer 4, a functionalized coating 60. Therefore, ideal materials for the specific task at hand can be utilized. The surfaces of the separation layers 4 are shown coated with the functionalized coating 60 for the separation process.

Figure 25B:
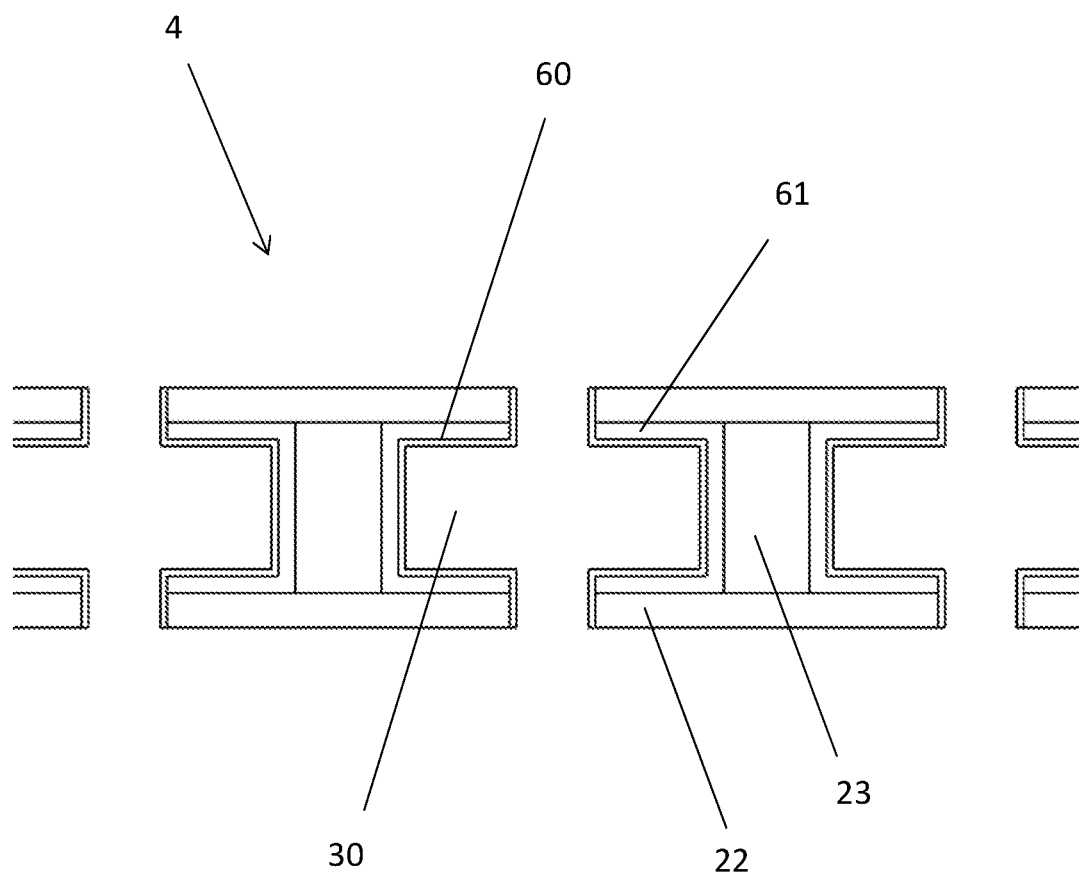

FIG. 25B shows an additional primer coating 61 applied to the separation layers 4 to facilitate bonding of the functionalized coating 60 to the separation layer 4. Many HPLC systems utilize silicon dioxide (also known as silica) spheres as the base structure that is functionalized. To utilize the current functionalized processes a "primer" of silica might be applied to the separation layers 4. One skilled in the art of "primers" and functionalization surfaces could engineer may materials to meet a given specific separation task.

Figure 25C:
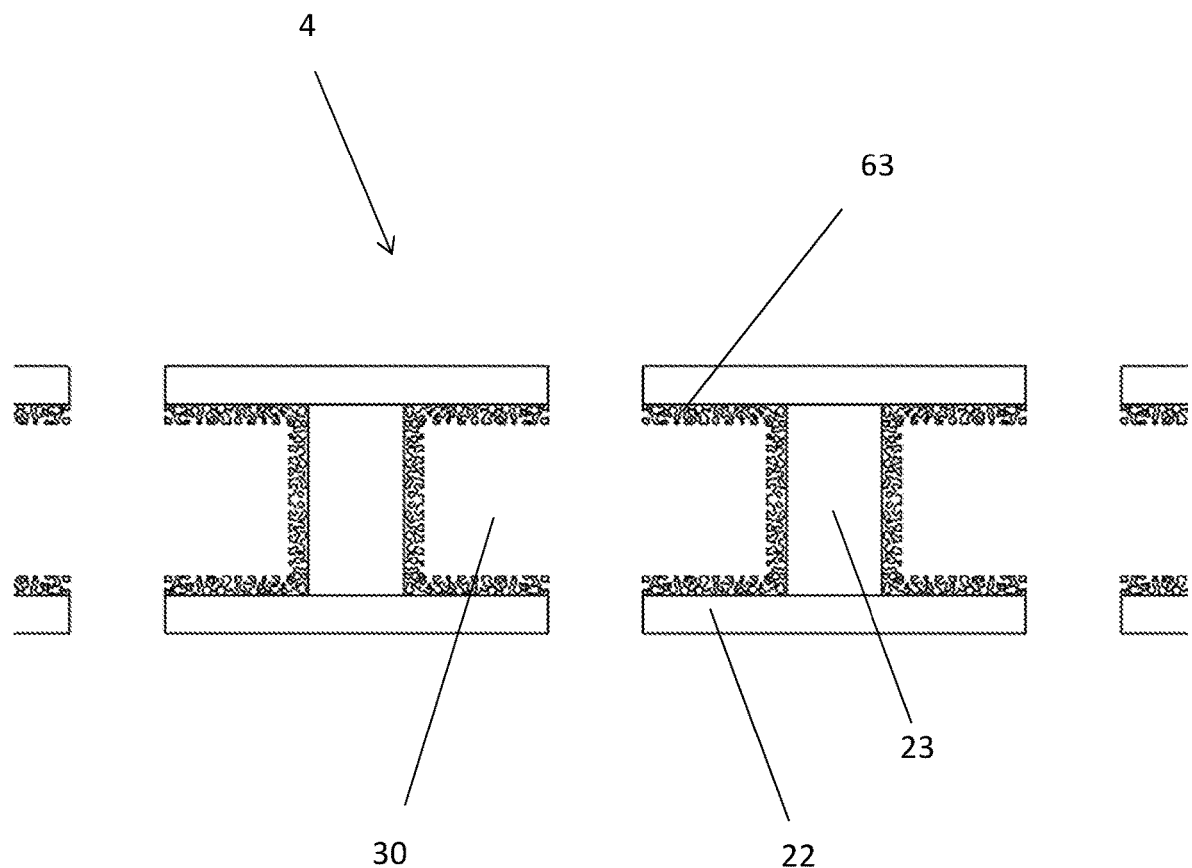

FIG. 25C illustrates a porous material 63 located on the surfaces of the separation layers 4. The functionalized coating 60 is applied to the surfaces of the porous material 63. The porous material 63 is used when increased separation surface area is desired.

Figure 26:
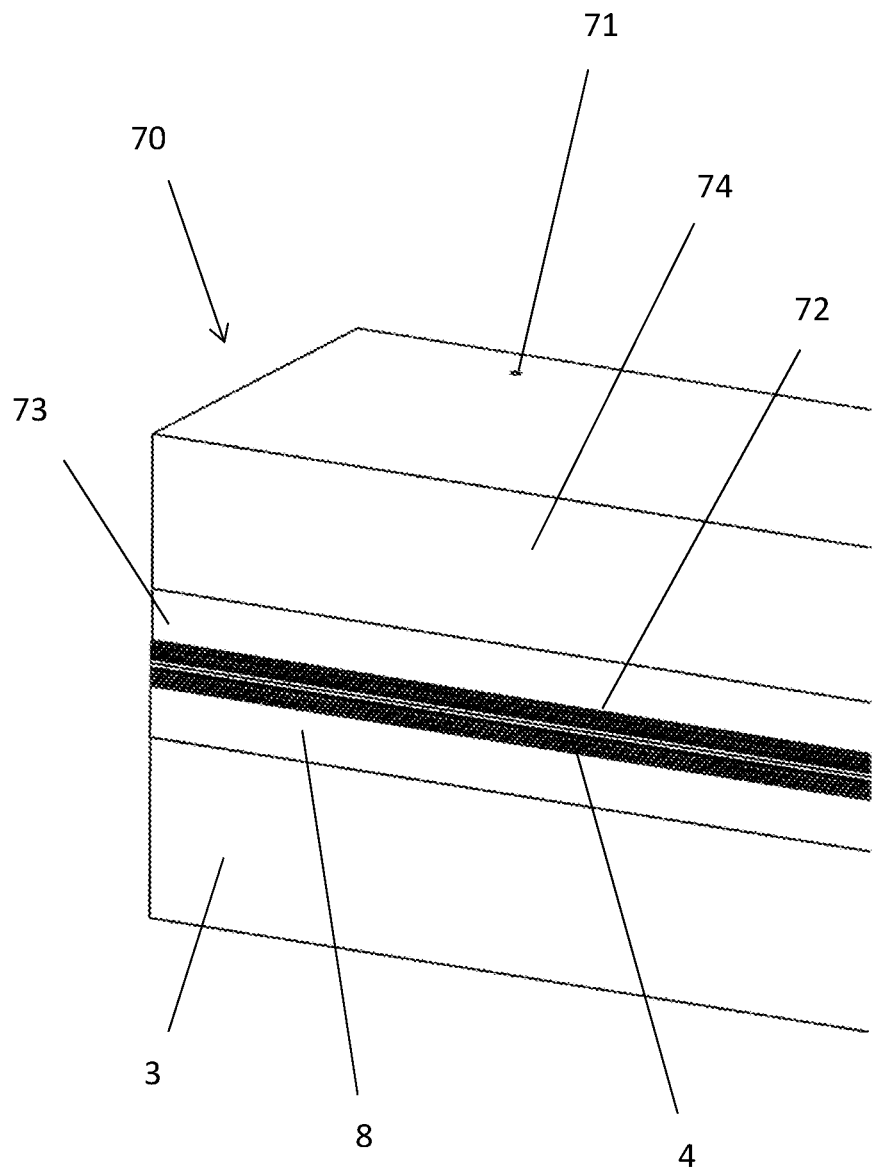
FIG. 26 is a perspective view of a section of an alternate embodiment of a separation device constructed according to the present invention

FIG. 26 shows yet another alternate embodiment of the separation device. The fabricated stack and photoresist as described in the previous embodiments are assembled on top of the separation device. The mirror separation device 70 has the mirror inlet port 71 and outlet port located in a mirror location as those disclosed above. The mirror separation device 70 would supply and be supplied by the inlet plenums and outlet plenums of the mirror separation layers 72. A mirror isolation layer 73 is stacked above the mirror separation layers 72, with a mirror substrate 74 being the uppermost layer. This deployment allows for twice the flow for a device of a given etch depth. With semiconductor processing there is a practical limit to the depth of a directional etch. If the practical depth limitation is met and more flow is still required, mated mirror devices such as the one illustrated in FIG. 26 can be deployed.

The technology disclosed herein addresses improved configurations for separation devices. The improvements disclosed are independent of the actual surface material used for the separation. There are a myriad of choices for materials that would suffice to form the separation layers and the coatings on their surfaces. Further, the type of material used to create the separation layers is not limited to semiconductor materials. Glass or metals could be deployed. It should be self-evident that one skilled in the art of catalytic materials could engineer a specific functionalized material to be used for separation to be used in a given application.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the present disclosure in the form disclosed. Many modifications and variations will be apparent to those of ordinary skill in the art without departing from the scope and spirit of the present disclosure. Exemplary embodiments were chosen and described in order to best explain the principles of the present disclosure and its practical application, and to enable others of ordinary skill in the art to understand the present disclosure for various embodiments with various modifications as are suited to the particular use contemplated.

The terminology used herein is for the purpose of describing particular embodiments only and is not intended to be limiting of the technology. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, may be identified throughout the drawings with like reference characters. It will be further understood that several of the figures are merely schematic representations of the present disclosure. As such, some of the components may have been distorted from their actual scale for pictorial clarity.

In the foregoing description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A separation device, comprising:
   at least one separation panel comprising:
   an inlet port and an outlet port;
   an inlet plenum, the inlet plenum having a trapezoid shape, the trapezoid shape of the inlet plenum having an inlet plenum wider end and an inlet plenum narrower end, the inlet plenum wider end facing the inlet port;
   an outlet plenum, the outlet plenum having the trapezoid shape, the trapezoid shape of the outlet plenum having an outlet plenum wider end and an outlet plenum narrower end, the outlet plenum narrower end facing the outlet port;
   at least two spacer layers and a main layer, sacrificial material being removed in the at least two spacer layers and the main layer to form the inlet plenum, the outlet plenum, and multiple structures forming a plurality of channels therebetween, surfaces of the plurality of channels serving as separation surfaces, wherein the inlet plenum having the trapezoid shape is configured to supply substantially equal fluid flow to each of the plurality of channels.

2. The separation device of claim 1, wherein a plurality of the at least one separation panel are stacked in the separation device.

3. The separation device of claim 2, wherein the separation device includes separation layers, each separation layer including the at least two spacer layers and the main layer, and wherein the inlet plenum and the outlet plenum are in fluid communication with each of the separation layers.

4. The separation device of claim 1, wherein the plurality of channels have length to width and length to height aspect ratios of at least one.

5. The separation device of claim 1, wherein the separation surfaces attract and retain selected components in a solution introduced into the separation device.

6. The separation device of claim 1, wherein the multiple structures forming the plurality of channels are segmented structures, the segmented structures including rectangular posts.

7. The separation device of claim 1, wherein the surfaces of the plurality of channels are porous.

8. The separation device of claim 1, wherein the surfaces of the plurality of channels have a coating thereon.

9. The separation device of claim 1, wherein the surfaces of the plurality of channels are covered with a primer, the primer in turn being covered with a coating.

10. The separation device of claim 9, wherein the primer is silicon dioxide.

11. The separation device of claim 3, wherein the separation layers comprise silicon and silicon dioxide.

12. The separation device of claim 3, wherein the separation layers comprise silicon and silicon nitride.

13. The separation device of claim 3, wherein the separation layers comprise silicon nitride and silicon dioxide.

14. A mirrored layer separation device, comprising:
    at least one separation panel and at least one mirrored separation panel; each of the at least one separation panel and each of the at least one mirrored separation panel comprising:
    an inlet port and an outlet port;
    an inlet plenum, the inlet plenum having a trapezoid shape, the trapezoid shape of the inlet plenum having an inlet plenum wider end and an inlet plenum narrower end, the inlet plenum wider end facing the inlet port;
    an outlet plenum, the outlet plenum having the trapezoid shape, the trapezoid shape of the outlet plenum having an outlet plenum wider end and an outlet plenum narrower end, the outlet plenum narrower end facing the outlet port; and
    at least two spacer layers and a main layer, sacrificial material being removed in the at least two spacer layers and the main layer to form the inlet plenum, the outlet plenum, and multiple structures forming a plurality of channels therebetween, surfaces of the plurality of channels serving as separation surfaces, wherein the inlet plenum having the trapezoid shape is configured to supply substantially equal fluid flow to each of the plurality of channels; and wherein
    each of the at least one mirrored separation panel is mated to a corresponding separation panel, the at least two spacer layers and the main layer of each of the at least one mirrored separation panel being stacked in reverse order as compared to the at least two spacer layers and the main layer of the at least one separation panel.

15. The separation device of claim 14, wherein a plurality of the at least one separation panel and a plurality of the at least one mirrored separation panel are stacked in the separation device.

16. The separation device of claim 15, wherein the separation device includes separation layers, each separation layer including the at least two spacer layers and the main layer, and wherein the inlet plenum and the outlet plenum are in fluid communication with each of the separation layers.

17. The separation device of claim 14, wherein the plurality of channels have length to width and length to height aspect ratios of at least one.

18. The separation device of claim 14, wherein the separation surfaces attract and retain selected components in a solution introduced into the separation device.

19. The separation device of claim 14, wherein the surfaces of the plurality of channels have a coating thereon.

20. The separation device of claim 14, wherein the surfaces of the plurality of channels are covered with a primer, the primer in turn being covered with a coating.

* * * * *